(12) United States Patent
Tayama

(10) Patent No.: US 6,315,693 B1
(45) Date of Patent: Nov. 13, 2001

(54) CONTROL SYSTEM FOR CONTROLLING CONTINUOUSLY VARIABLE TRANSMISSION

(75) Inventor: Ryuji Tayama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/414,305

(22) Filed: Oct. 6, 1999

(30) Foreign Application Priority Data

Oct. 6, 1998 (JP) .................................................. 10-284224

(51) Int. Cl.$^7$ ................................. B60K 4/12; F16H 59/00
(52) U.S. Cl. ................................. 477/46; 474/18; 474/28
(58) Field of Search .......................... 474/18, 28; 477/37, 477/40, 44, 45, 46, 111, 98, 92; 123/339, 587, 329, 399

(56) References Cited

U.S. PATENT DOCUMENTS

| | | | |
|---|---|---|---|
| 4,825,829 | * | 5/1989 | Abe ...................................... 123/339 |
| 4,944,199 | * | 7/1990 | Okino et al. ...................... 477/111 X |
| 5,218,541 | * | 6/1993 | Sakakibara et al. ............... 477/44 X |
| 5,514,047 | * | 5/1996 | Tibbles et al. .......................... 477/46 |
| 5,658,216 | * | 8/1997 | Ochiai .................................... 477/46 |
| 5,782,719 | * | 7/1998 | Adachi ............................... 477/44 X |
| 5,899,830 | * | 5/1999 | Tabata .................................. 477/111 |

FOREIGN PATENT DOCUMENTS

| | | |
|---|---|---|
| 58180865 | 10/1983 | (JP) . |
| 250353 | * 11/1986 | (JP) . |
| 1255756 | 10/1989 | (JP) . |
| 7317863 | 12/1995 | (JP) . |

OTHER PUBLICATIONS

Patent Abstracts of Japan, Publication No. 07317863, Dec. 8, 1995, Fuji Heavy Ind Ltd, Watanabe Yoshikazu.

* cited by examiner

*Primary Examiner*—David A. Bucci
*Assistant Examiner*—Marcus Charles
(74) *Attorney, Agent, or Firm*—Martin A. Farber

(57) ABSTRACT

In a control system for controlling a continuously variable transmission of a vehicle having an idle speed control valve disposed in a bypass passage around a throttle valve, a throttle opening angle guard value is set to specify a throttle full-closed change gear line in accordance with engine coolant temperature. The actual throttle opening angle is compared with the throttle opening angle guard value, and the larger of them is set as a change gear ratio calculating throttle opening angle. Further, by referring to a basic change gear characteristic map, and in accordance with the change gear ratio calculating throttle opening angle and vehicle speed as parameters, a target primary pulley revolution number is set.

4 Claims, 9 Drawing Sheets

CONTROL SYSTEM FOR CONTROLLING CONTINUOUSLY VARIABLE TRANSMISSION

BACKGROUND OF THE INVENTION

1. Field of the Invention

The present invention relates to a control system for controlling a continuously variable transmission which, even during the warm-up operation of an engine including an engine cool condition in which the amount of the air allowed to pass by an idle speed control valve increases, in deceleration due to the full-closed condition of a throttle valve, can secure intake pipe negative pressure downstream of the throttle valve, which can be used as the power source of a master back defining a brake assist system, to thereby be able to obtain a proper brake force.

2. Description of the Related Art

Conventionally, in a control system for controlling a continuously variable transmission, a target primary pulley revolution number is set by referring to a basic change gear characteristic map which gives a target primary revolution number with the opening angle of a throttle valve (throttle opening angle) and a vehicle speed as parameters, a target change gear ratio is calculated from a ratio between the thus set target primary pulley revolution number and an actual secondary pulley revolution number, and an actual change gear ratio, which is given by a primary pulley capable of inputting therein the revolution of an engine and a secondary pulley capable of inputting therein power from the primary pulley through power transmission means, is so controlled as to converge to the target change gear ratio, whereby the change gear ratio is followingly controlled so that the actual primary pulley revolution number converges to the target primary pulley revolution number.

Due to this, the change gear ratio can be set in a continuously variable manner from low up to overdrive in accordance with the basic change gear characteristic map, and thus the change gear ratio can be properly set according to the driving conditions.

In the basic change gear characteristic map, for example, as shown in FIG. 11, with a horizontal axis expressing a vehicle speed and a vertical axis expressing a target primary pulley revolution number NP, there is formed a change gear chart which is enclosed by a low side change gear line, an overdrive (OD) side change gear line, and throttle full-open and full-closed change gear lines, while the target primary pulley revolution number can be set according to the vehicle speed and throttle opening angle. For example, when deceleration is carried out by closing the throttle completely from a high vehicle speed, the change gear ratio is controlled in such a manner that the primary pulley revolution number passes through the OD side change gear line and throttle full-closed change gear line.

Here, between the engine and the continuously variable transmission, there is interposed an electromagnetic clutch or a torque converter. Therefore, when the continuously variable transmission and engine are directly connected together during the running condition of the vehicle, the revolution number of the engine coincides with the primary pulley revolution number. And, in deceleration due to the full-closed condition of the throttle valve, because of a brake force given from the driving wheel side, the engine revolution number depends on the revolution number of the primary pulley of the continuously variable transmission connected to the engine.

By the way, in recent years, for improvement in fuel consumption and vehicle running performance, there is found a tendency that the throttle full-closed change gear line is lowered down to the low revolution number side.

However, in an engine cool condition in which the temperature of an engine coolant is low, the engine is held in an unstable condition. Therefore, in deceleration due to the full-closed condition of the throttle valve, if the throttle full-closed change gear line is lowered to thereby decrease the primary pulley revolution number so that the revolution number of the engine connected to the primary pulley is reduced, then there can be generated uncomfortable vibrations or engine stall because of the engine friction depending on the viscosity of oil, deteriorated combustion efficiency of the engine and the like.

In order to cope with the above troubles, in Japanese Patent Unexamined Publication No. 58-180865 of Showa, there is disclosed a technology in which, only in the engine cool condition where the engine coolant temperature is lower than a set value, a throttle valve opening angle, which is used as a parameter when setting a target primary pulley revolution number, is uniquely raised by a given opening angle to thereby shift the whole of the basic change gear characteristic to the high revolution number side. Accordingly, the primary pulley revolution number is increased and thus the engine revolution number is increased to thereby improve the combustion of the engine, whereby the above-mentioned uncomfortable vibrations or engine stall can be prevented.

On the other hand, recently, in most of vehicles including a mini-sized motor vehicle, there is mounted a master vac (brake power assist) as a brake assist system. This master vac, as known well, is composed of a brake booster of a diaphragm type. In the master vac, as the power source thereof, there is used intake pipe negative pressure which is produced downstream of the throttle valve of the engine. That is, the intake pipe negative pressure is used to assist a brake pedal effort acting on an operating rod so disposed as to adjoin a brake pedal, so that large master cylinder operation pressure can be generated with a small brake pedal effort. Such assisting use of the intake pipe negative pressure can provide a brake force several times larger than that obtained when only the brake pedal effort is used.

Here, generally, the intake pipe negative pressure, which is generated downstream of the engine throttle valve and is used as the power source of the master back, is substantially determined by a difference between the intake amount demanded by engine (≈displacement× engine revolution number) and the intake amount supplied to engine (≈sum of throttle valve passing air flow amount and idle speed control valve passing air flow amount).

Therefore, if the throttle full-closed change gear (transmission) line is lowered to the low revolution number side in the above-mentioned manner, then the engine revolution number in deceleration due to the full-closed condition of the throttle valve is reduced to thereby decrease the engine demand intake amount, which makes it difficult for the intake pipe negative pressure to be generated. Also, during the engine warm-up operation on the way to the completely warmed condition of the engine including an engine cool condition, in order to compensate the engine friction due to the viscosity of oil and worsened engine combustion performance, the opening angle of an idle speed control valve (which is hereinafter referred to as ISC valve) disposed in a bypass passage bypassing the throttle valve is set in such a manner as to increase according to the engine coolant temperature. Thus, the ISC valve passing air flow amount can be increased and the amount of the air to be supplied to the engine (that is, engine supply air amount) can be thereby increased.

Therefore, in deceleration during the engine warm-up operation on the way to the engine completely warmed condition including an engine cool condition, even if the throttle valve is closed full, the engine supply air flow amount increases due to an increase in the ISC valve passing air flow amount, which makes it further difficult to generate the intake pipe negative pressure downstream of the throttle valve. Further, even in a condition where the warm-up of the engine is completed (in a completely warmed condition), during the operation of an auxiliary machine such as an air conditioner or the like, the opening angle of the ISC valve is caused to increase in order that, in correspondence to an increase in the engine load due to the operation of a compressor for the air conditioner in operation, the ISC valve passing air flow amount can be increased and the engine supply air flow amount can be thereby increased. This, however, makes it difficult for the intake pipe negative pressure to be generated.

Here, when the brakes are in operation, normally, in a state where the press-down of an accelerator pedal is removed and the throttle valve is closed fully, the brake pedal is pressed down. For this reason, especially, in deceleration due to the full-closed condition of the throttle valve during the engine warm-up operation on the way to the engine completely warmed condition including an engine cool condition, the intake pipe negative pressure downstream of the throttle valve runs short and thus the assist force by the master back is reduced, with the result that the holding of the brakes is worsened. The smaller the displacement of an engine to be carried on board a vehicle is, the more outstanding this tendency is.

By the way, in deceleration, because the throttle valve is fully closed, the engine supply air flow is provided by the idle speed control valve which is passing air flow amount and, therefore, in this state, it is possible that the opening angle of the ISC valve is forcibly decreased to thereby earn the intake pipe negative pressure downstream of the throttle valve. However, the ISC valve passing air flow amount depending on the opening angle of the ISC valve is set in such a manner as to compensate the engine friction, the drive torque of auxiliary devices and the like. Therefore, in deceleration due to the full-closed condition of the throttle valve, if the ISC valve is forcibly closed to thereby decrease the ISC valve passing air flow amount, then there can be induced, in sudden deceleration, an engine stall due to the shortage of the air amount supplied to the engine. That is, the forced reduction of the opening angle of the ISC valve is not be able to solve the problem found in the conventional structure fundamentally.

Also, in the above-cited conventional structure, only in the engine cool condition where the engine coolant temperature is lower than a set value, a throttle valve opening angle, which is used as a parameter when setting a target primary pulley revolution number, is uniquely raised by a given opening angle to thereby shift the whole of the basic change gear characteristic to the high revolution number side, whereby the primary pulley revolution number can be increased and the engine revolution number can be thereby increased. Therefore, in deceleration due to the full-closed condition of the throttle valve, when the engine coolant temperature is lower than a set value, due to the increased engine revolution number, the intake pipe negative pressure downstream of the throttle valve can be secured to thereby enhance the assist force of the master back which uses the intake pipe negative pressure as its power source. However, in an area where the engine coolant temperature is equal to and higher than the set value, the basic change gear characteristic is not shifted but remains as it is. That is, the brake assist force by the master back varies extremely with the set value as the border thereof, which raises an inconvenience that the driving feeling of the vehicle can be worsened.

Further, in the above-cited conventional structure, there is employed a technique which, in order to prevent the above-mentioned uncomfortable vibrations and engine stall, adds the uniquely defined given opening angle to the throttle valve opening angle. However, when the ISC valve passing air flow amount varies continuously as the ISC valve opening angle varies according to the engine coolant temperatures, such conventional technique is able to cope with differences between the continuously varying ISC valve passing air valve flow amounts only in a certain special range thereof; that is, such technique is not able to match the brake assist force of the master back to the differences between the continuously varying ISC valve passing air flow amounts over the whole range thereof. Also, when the engine coolant temperature is lower than the set value, the whole basic change gear characteristic is uniformly shifted by a given throttle valve opening angle and, therefore, due to differences between the engine coolant temperatures with the set value as the boundary thereof, the basic change gear characteristic of the continuously variable transmission is caused to vary as a whole, which raises an inconvenience that the driving feeling can be further worsened and thus controllability on the continuously variable transmission can also be worsened.

SUMMARY OF THE INVENTION

The invention aims at eliminating the drawbacks found in the above-mentioned conventional control system for controlling a continuously variable transmission. Accordingly, it is an object of the invention to provide a control system for controlling a continuously variable transmission which, even during an engine warm-up operation on the way to the engine completely warmed condition including an engine cool condition where the amount of the air passing through an idle speed control valve increases, in deceleration due to the full-closed condition of a throttle valve, is able to secure proper intake pipe negative pressure downstream of the throttle valve, thereby being able to enhance an assist force given by a master back using the intake pipe negative pressure as the power source thereof, provide a proper brake force, enhance a driving feeling, and enhance controllability on the continuously variable transmission.

In attaining the above object, according to a first aspect of the invention, there is provided a control system for controlling a continuously variable transmission of a vehicle having an idle speed control valve disposed in a bypass passage bypassing a throttle valve, the continuously variable transmission including:

a primary pulley inputting therein the rotation of an engine, which generates intake pipe negative pressure on the downstream of the throttle valve and applies it to a master back constructing a brake assist system as the power source thereof; and a secondary pulley inputting therein power from the primary pulley through power transmission means, the control system comprising:

throttle opening angle guard value setting means for setting a throttle opening angle guard value, which specifies a throttle full-closed change gear line, in accordance with an engine coolant temperature;

throttle opening angle comparing means for comparing an actual throttle opening angle with the throttle opening angle guard value;

change gear ratio calculating throttle opening angle setting means, in accordance with the comparison result, for setting larger one of the actual throttle opening angle and the throttle opening angle guard value as a change gear ratio calculating throttle opening angle; and, target primary pulley revolution number setting means for setting a target primary pulley revolution number while referring to a basic change gear characteristic map which gives the target primary pulley revolution number with the change gear ratio calculating throttle opening angle and vehicle speed as parameters, wherein the control system controls an actual change gear ratio given by the primary and secondary pulleys to converge to a target change gear ratio calculated from a ratio between the target primary pulley revolution number and an actual secondary pulley revolution number.

That is, during an engine warm-up operation on the way to the engine completely warmed condition including an engine cool condition, the opening angle of the idle speed control valve disposed in the bypass passage by passing the throttle valve is set in such a manner as to increase in correspondence to the engine coolant temperature, whereby, in deceleration due to the full-closed condition of the throttle valve, as the idle speed control valve passing air flow amount increases, the flow amount of the air supplied to the engine increases to thereby cause the shortage of the intake pipe negative pipe downstream of the throttle valve, and the engine revolution number in deceleration depends on the primary pulley revolution number. Further, the opening angle of the idle speed control valve to determine the idle speed control valve passing air flow amount causing the shortage of the intake pipe negative pipe downstream of the throttle valve in the full-closed condition of the throttle valve depends on the engine coolant temperature. In view of these facts, according to the above structure, when setting the target primary pulley revolution number from the basic change gear characteristic map, the throttle opening angle guard value to specify the throttle full-closed change gear line is set in accordance with the engine coolant temperature. And, the actual throttle opening angle is compared with the throttle opening guard value, and larger one of them is set as a change gear ratio calculating throttle opening angle. Also, the basic change gear characteristic map is referred to with the thus set change gear ratio calculating throttle opening angle and vehicle speed to thereby set the target primary pulley revolution number which determines a target change gear ratio.

Therefore, even during an engine warm-up operation on the way to the engine completely warmed condition including an engine cool condition where the idle speed control valve passing air flow amount increases, in deceleration due to the full-closed condition of the throttle valve, in correspondence to an increase in the idle speed control valve passing air flow amount, the throttle full-closed change gear line can be shifted to the high revolution number side. Then, due to the following control of the actual primary pulley revolution number after the target primary pulley revolution number, the revolution number of the engine connected to the primary pulley can be increased accurately in correspondence to an increase in the idle speed control valve passing air flow amount. Thanks to this, regardless of a difference between the idle speed control valve passing air flow amounts, in deceleration due to the full-closed condition of the throttle valve, owing to an increase in the engine revolution number, proper intake pipe negative pressure can be secured on the downstream of the throttle valve. Therefore, even during the engine warm-up operation on the way to the engine completely warmed condition including an engine cool condition where the idle speed control valve passing air flow amount increases, in deceleration due to the full-closed condition of the throttle valve, the intake pipe negative pressure can be properly secured downstream of the throttle valve to thereby enhance the assist force of the master back which uses the intake pipe negative pressure as the power source thereof, which makes it possible to provide a proper brake force.

In addition, the throttle opening angle guard value setting means sets the throttle opening angle guard value at a given value on the throttle valve opening side when the engine coolant temperature is lower than a first set value indicating an engine cool condition; sets the throttle opening angle guard value in such a manner that it decreases gradually, as the engine coolant temperature rises from the first set value toward a second set value which can be regarded as an indication of an engine warm-up completed condition; and, sets the throttle opening angle guard value at a throttle valve full-closed opening angle when the engine coolant temperature is equal to or higher than the second set value.

According to a second aspect of the invention, there is provided a control system for controlling a continuously variable transmission of a vehicle having an idle speed control valve disposed in a bypass passage bypassing a throttle valve, the continuously variable transmission including:

a primary pulley inputting therein the rotation of an engine, which generates intake pipe negative pressure on the downstream of the throttle valve and applies it to a master back constructing a brake assist system as the power source thereof; and a secondary pulley inputting therein power from the primary pulley through power transmission means, the control system comprising:

throttle opening angle guard value setting means for setting a throttle opening angle guard value, which specifies a throttle full-closed change gear line, in accordance with the opening angle of the idle speed control valve;

throttle opening angle comparing means for comparing an actual throttle opening angle with the throttle opening angle guard value;

change gear ratio calculating throttle opening angle setting means, in accordance with said comparison result, for setting larger one of the actual throttle opening angle and the throttle opening angle guard value as a change gear ratio calculating throttle opening angle; and, target primary pulley revolution number setting means for setting a target primary pulley revolution number while referring to a basic change gear characteristic map which gives the target primary pulley revolution number with the change gear ratio calculating throttle opening angle and vehicle speed as parameters, wherein the control system controls an actual change gear ratio given by the primary and secondary pulleys to converge to a target change gear ratio calculated from a ratio between the target primary pulley revolution number and an actual secondary pulley revolution number.

With this structure, the opening angle of the idle speed control valve, which determines the idle speed control valve passing air flow amount causing the shortage of the intake pipe negative pressure downstream of the throttle valve in the full-closed condition of the throttle valve, is used directly to thereby set a throttle opening angle guard value which specifies the throttle full-closed change gear line. And, the thus set throttle opening angle guard value is compared with an actual throttle opening angle and larger one of them is set as a change gear ratio calculating throttle opening angle. Then, the basic change gear characteristic map is referred to with the thus set change gear ratio calculating throttle opening angle and vehicle speed as parameters to thereby set a target primary pulley revolution number which determines a target change gear ratio.

Therefore, even during the engine warm-up operation on the way to the engine completely warmed condition including an engine cool condition, in deceleration due to the full-closed condition of the throttle valve, in accordance with the opening angle of the idle speed control valve which corresponds directly to an increase in the idle speed control valve passing air flow amount, the throttle full-closed change gear line is properly shifted to the high revolution number side and, due to the following control of the actual primary pulley revolution number after the target primary pulley revolution number, the engine revolution number can be increased further properly in correspondence to an increase in the idle speed control valve passing air flow amount. Also, thanks to this, in deceleration due to the full-closed condition of the throttle valve, even if not only the idle speed control valve passing air flow amount varies due to the difference between the engine coolant temperatures but also the idle speed control valve passing air flow amount increases due to an increase in the opening angle of the idle speed control valve caused by the operation of an auxiliary machine such as an air conditioner or the like in the engine completely warmed condition, the engine revolution number can be increased in correspondence to such variation and increase, which makes it possible to secure the intake pipe negative pressure downstream of the throttle valve properly to thereby enhance the assist force of the master back using the intake pipe negative pressure as the power source thereof, so that there can be obtained a proper brake force.

In addition, the throttle opening angle guard value setting means sets the throttle opening angle guard value at a given value on the throttle valve opening side when the opening angle of the idle speed control valve is equal to or larger than a first set value set on the full-open side; sets the throttle opening angle guard value in such a manner that it decreases gradually, as the opening angle of the idle speed control valve decreases from the first set value toward a second set value set on the full-closed side; and, sets the throttle opening angle guard value at a throttle valve full-closed opening angle when the opening angle of the idle speed control valve is equal to or smaller than the second set value.

DETAILED DESCRIPTION OF THE PREFERRED EMBODIMENTS

Now, a description will be given below of the preferred embodiments of a control system for controlling a continuously variable transmission according to the invention with reference to the accompanying drawings.

[First Embodiment]

FIGS. 1 to 8 respectively show a first embodiment of a control system for controlling a continuously variable transmission according to the invention.

Figure 1:
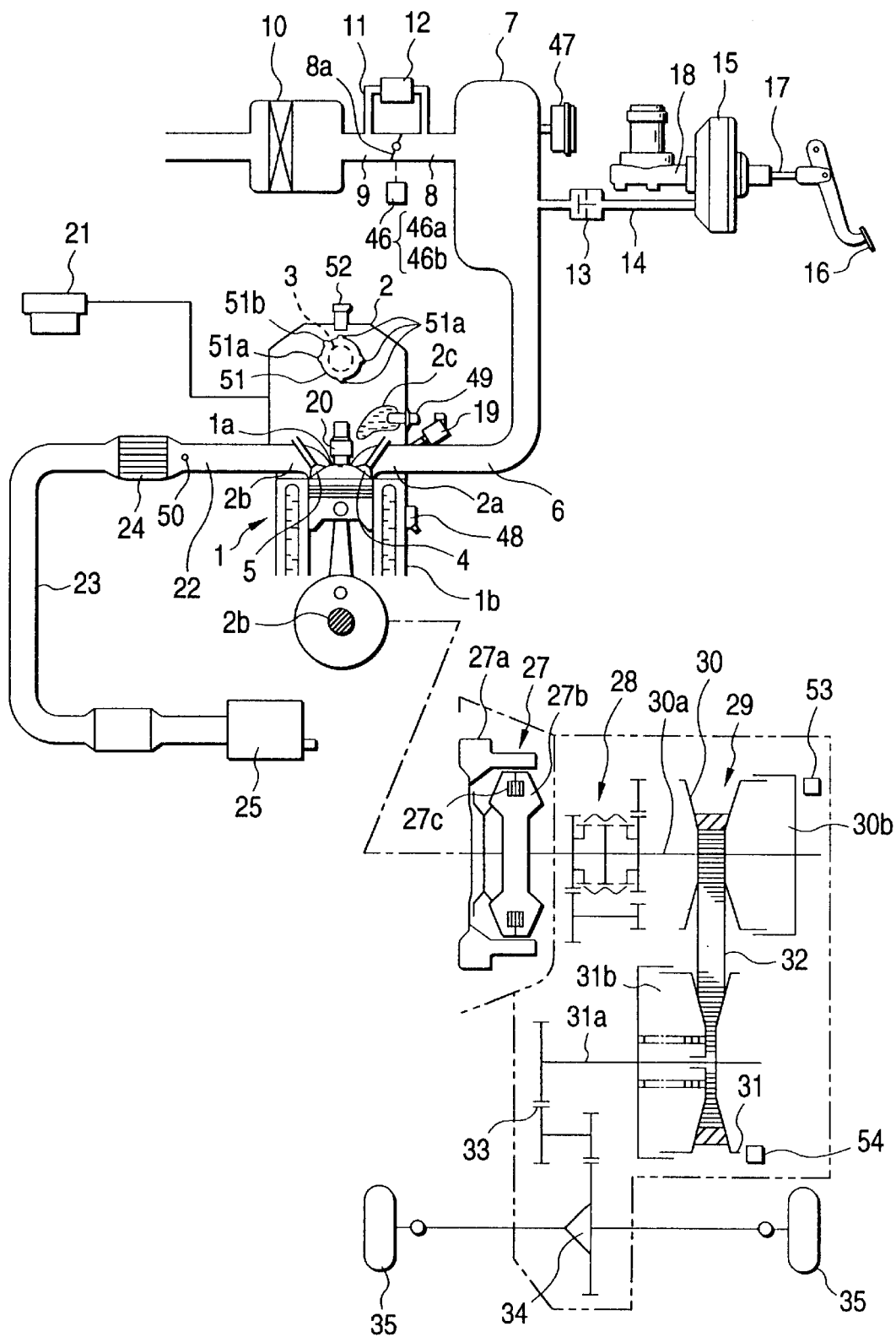
FIG. 1 is a schematic structure view of a vehicle drive system including an engine and a continuously variable transmission, showing a first embodiment of a control system for controlling the continuously variable transmission.

At first, a description will be given below of a schematic structure of a vehicle drive system including an engine and a continuously variable transmission employed in the first embodiment with reference to FIG. 1.

Reference character 1 designates an engine (a straight multi-cylinder engine) for a vehicle and, in the cylinder head 2 of the engine 1, there are formed intake ports 2a and exhaust ports 2b in such a manner that they respectively correspond to their associated cylinders. And, between these ports 2a, 2b and the combustion chamber 1a of the engine 1, there are interposed an intake valve 4 and an exhaust valve 5 which can be opened and closed at a given timing by a cam (not shown) which is disposed in a cam shaft 3.

As an intake system of the engine 1, there is provided an intake manifold 6 in communication with the respective intake ports 2a, and there is disposed a throttle chamber 8 including therein a throttle valve 8a which can be operated in linking with an accelerator pedal, while the throttle chamber 8 communicates with the intake manifold 6 through a collector chamber 7 where the intake passages of the respective cylinders gather. And, upstream of the throttle chamber 8, there is disposed an air cleaner 10 through an intake pipe 9.

Also, to the intake pipe 9, there is connected a bypass passage 11 which bypasses the throttle valve 8a and, on the bypass passage 11, there is mounted an idle speed control valve (which is hereinafter referred to as an ISC valve) 12. The ISC valve 12, in an idle operation where the throttle valve 8a is closed full, adjusts the ISC valve passing air flow amount (the flow amount of the air allowed to pass) through the bypass passage 11 according to the opening angle of the ISC valve 12 to thereby control the idle revolution number.

By the way, in the present embodiment, the ISC valve 12 is formed of a duty solenoid valve or the like; the opening angle of the ISC valve 12 is controlled by the duty ratio of a control duty signal output from an engine control device (which is hereinafter referred to as ECU) 60 which will be discussed later, and the idle revolution number is controlled by the ISC valve passing air flow amount; and, the opening angle of the ISC valve 12 increases as the duty ratio of the control duty signal increases, and the idle revolution number increases as the ISC valve passing air flow amount increases.

Also, to the collector chamber 7, there is connected a master vac (brake power assist) 15 which forms a brake assist system, through a negative pressure supply pipe 14 incorporating a check valve 13 therein. The master vac 15 is made of a brake booster of a diaphragm type and uses, as the power source thereof, the intake pipe negative pressure that is generated downstream of the throttle valve 8a of the engine 1. The master vac 15 assists a brake pedal effort acting on a operating rod 17 disposed to be continuous with a brake pedal 16 to thereby apply pressure to a master cylinder 18; that is, the master vac 15 is capable of generating large master cylinder operation pressure with a small brake pedal effort to thereby provide a brake force several times larger than the brake force that can be obtained only by the brake pedal effort.

Also, just upstream of the intake ports 2a of the respective cylinders of the intake manifold 6, there is disposed an injector 19 and, in the cylinder head 2, there are ignition plugs 20 for the respective cylinders in such a manner that their respective discharge electrodes disposed in the leading ends thereof are exposed to the combustion chamber 1a of the engine 1. And, the ignition plugs 20 are respectively connected to an ignition coil 21 with an igniter built therein.

On the other hand, as an exhaust system of the engine, there is disposed an exhaust pipe 23 which communicates with the collecting portion of an exhaust manifold 22 in communication with the respective exhaust ports 2b of the cylinder head 2. The exhaust pipe 23 includes a catalyst converter 24 mounted thereon and communicates with a muffler 25.

Next, a description will be given below of a power transmission system including a continuously variable transmission.

To the crankshaft 26 of the engine 1, there is connected a continuously variable transmission 29 through an electromagnetic clutch 27 and a forward/backward switching device 28. In more detail, the electromagnetic clutch 27 is a clutch of an electromagnetic powder type; and, the electromagnetic clutch 27 includes a drive member 27a directly connected to the crankshaft 26 of the engine 1. The electromagnetic clutch 27 further includes a driven member 27b and, to the output shaft of the driven member 27b, there is continuously connected the input shaft 30a of the continuously variable transmission 29 through the forward/backward switching device 28.

And, the driven member 27b of the electromagnetic clutch 27 incorporates a clutch coil 27c therein. If a clutch control current is supplied to the clutch coil 27c from transmission control unit (which is hereinafter referred to as TCU) 80 to be discussed later, then the electromagnetic powders are connected together to collect in a gap between the two members 27a and 27b and, due to the connecting power of the electromagnetic powders, the engine torque is transmitted to the continuously variable transmission 29 through the forward/backward switching device 28.

Also, to the forward/backward switching device 28, there is continuously connected a select lever (not shown) and, according to the operation of the select lever, a neutral, forward, or backward position can be selected.

Further, in the continuously variable transmission 29, a primary pulley 30 and a secondary pulley 31, the groove widths of which are respectively variable, are pivotally supported respectively on an input shaft 30a and an output shaft 31a which are arranged parallel to each other. Between the two pulleys 30 and 31, there is provided a drive belt 32 which serves as power transmission means. And, the output shaft 31a of the continuously variable transmission 29 is connected to a driving wheel 35 through a reduction gear train 33 and a differential gear 34.

And, to the primary pulley 30 and secondary pulley 31 of the continuously variable transmission 29, there are continuously connected two oil pressure cylinders 30b and 31b which are respectively capable of varying the groove widths of the respective pulleys 30 and 31. That is, the oil pressures supplied to the two oil pressure cylinders 30b and 31b are controlled by oil pressure control unit 36 shown in FIG. 2, thereby being able to control a change gear ratio employed by the continuously variable transmission 29.

Now, a description will be given below of the oil pressure control unit 36 with reference to FIG. 2. The oil pressure control unit 36 comprises a change gear control valve 37 of a proportional solenoid type and a line pressure control valve 38 of a proportional solenoid type which can be respectively operated by a coil current supplied from the TCU 80. In particular, the change gear control valve 37 is used to control primary pressure Pp to be supplied to the oil pressure cylinder 30b of the primary pulley 30, and the line pressure control valve 38 is used to control line pressure $P_L$ to be supplied to the oil pressure cylinder 31b of the primary pulley 31.

And, oil stored in the oil pan 39 of the continuously variable transmission 29 is pressure fed through an oil filter 40 and an oil pump 41 to the line pressure control valve 38, while a line pressure controlled by the line pressure control valve 38 is supplied to the oil pressure cylinder 31b of the primary pulley 31. Also, the line pressure $P_L$ controlled by the line pressure control valve 38 is supplied to the change gear control valve 37, while the primary pressure Pp, which is controlled by the change gear control valve 37 with the line pressure $P_L$ used as the base pressure thereof, is supplied to the oil pressure cylinder 30b of the primary pulley 30.

In the present embodiment, the change gear control valve 37 is set such that, when the value of the current supplied to the solenoid 37a of the change gear control valve 37 from the TCU 80 is 0, then the drain port of the change gear control valve 37 can be closed fully due to the energizing force of a spring incorporated in the change gear control valve 37. Thus, if the oil is drained in accordance with the current value from the TCU 80, then the primary pressure Pp can be controlled. That is, in the present embodiment, as the current value supplied to the solenoid 37a of the change gear control valve 37 from the TCU 80 increases, the drain amount increases, so that the spool 37b of the change gear control valve 37 is moved to the left in FIG. 2 and the primary pressure Pp is thereby lowered. And, due to such decrease in the primary pressure Pp supplied to the oil pressure cylinder 30b of the primary pulley 30, not only the groove width of the primary pulley 30 increases to thereby reduce the winding diameter of the drive belt 32 with respect to the primary pulley 30, but also the groove width of the secondary pulley 31, which can be rotationally driven by the primary pulley 30 through the drive belt 32, decreases to thereby increase the winding diameter of the drive belt 32 with respect to the secondary pulley 31. As a result of this, the change gear ratio (=actual primary pulley revolution number NPo/actual secondary pulley revolution number NSo) of the continuously variable transmission 29 increases to thereby shift the gear down to the low speed side.

Figure 2:
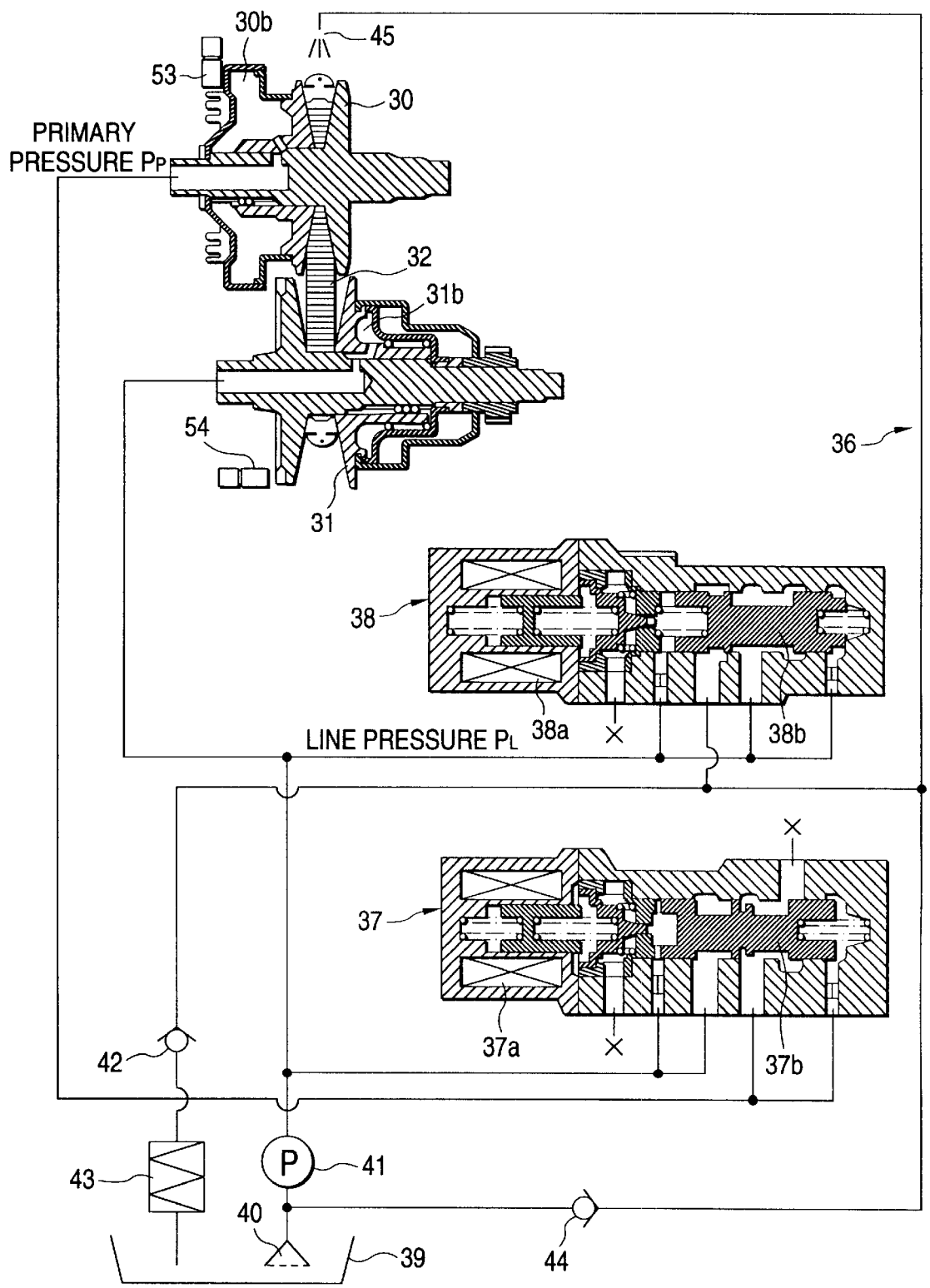
FIG. 2 is a schematic structure view of an oil pressure control unit employed in the first embodiment.

On the other hand, as the current value supplied to the solenoid 37a of the change gear control valve 37 from the TCU 80 decreases, the drain amount decreases, so that the spool 37b of the change gear control valve 37 is moved to the right in FIG. 2 and the primary pressure Pp is thereby raised. And, due to such increase in the primary pressure Pp supplied to the oil pressure cylinder 30b of the primary pulley 30, not only the groove width of the primary pulley 30 decreases to thereby increase the winding diameter of the drive belt 32 with respect to the primary pulley 30, but also the groove width of the secondary pulley 31, which can be rotationally driven by the primary pulley 30 through the drive belt 32, increases to thereby reduce the winding diameter of the drive belt 32 with respect to the secondary pulley 31. As a result of this, the change gear ratio (=actual primary pulley revolution number NPo/actual secondary pulley revolution number NSo) of the continuously variable transmission 29 decreases to thereby shift the gear up to the overdrive (OD) side.

Also, the line pressure control valve 38 is similarly set such that, when the current value supplied to the solenoid 38a of the line pressure control valve 38 from the TCU 80 is 0, then the drain portion of the line pressure control valve 38 can be closed full by the energizing force of a spring incorporated in the line pressure control valve 37; and, if the oil is drained in accordance with the current value from the TCU 80, then the line pressure $P_L$ can be controlled. That is, in the present embodiment, as the current value supplied to the solenoid 38a of the line pressure control valve 38 from the TCU 80 increases, the oil drain amount increases, so that the spool 38b of the line pressure control valve 38 is moved to the left in FIG. 2 and the line pressure PL is thereby decreased. On the other hand, as the current value decreases, the oil drain amount decreases, so that the spool 38b of the line pressure control valve 38 is moved to the right in FIG. 2 and the line pressure $P_L$ is thereby raised. By the way, the line pressure $P_L$ is supplied to the oil pressure cylinder 31b of the secondary pulley 31, thereby providing the secondary pulley 31 with a torque transmissible pressing force through the contact of the secondary pulley 31 with the drive belt 32.

And, the surplus oil given by the line pressure control valve 38 is returned through a check valve 42 and an oil cooler 43 back to the oil pan 39 and is also returned through a pressure control valve 44 upstream of the oil pump 41; and, due to the pressure controlling operation of the check valve 42 and pressure control valve 44, part of the surplus oil is jetted out from a nozzle 45 to thereby lubricate the drive belt 32 as well as the two primary and secondary pulleys 30 and 31.

Next, a description will be given below of various sensors which are used to detect the running conditions of the engine 1 and the conditions of the continuously variable transmission 29.

In the engine 1, there are disposed various sensors which are used to detect the running conditions of the engine 1 and, at first, a description will be given below of these sensors. To the throttle valve 8a, there is continuously connected a throttle sensor 46 incorporating therein a throttle opening angle sensor 46a and an idle switch 46b which can be turned on when the throttle valve 8a is closed full. Also, to the collector chamber 7, there is continuously connected a pressure sensor 47 which is capable of detecting the intake pipe pressure downstream of the throttle valve 8a in absolute pressure.

Also, on the cylinder block lb of the engine 1, there is mounted a knock sensor 48; an engine coolant temperature sensor 49 for detecting the engine coolant temperatures Tw is so disposed as to face a coolant passage 2c formed in the cylinder head 2; and, upstream of the catalyst converter 24, there is disposed an $O_2$ sensor 50.

Further, to the cam shaft 3 which rotates one-half with respect to the crankshaft 26 of the engine 1, there is continuously connected a signal rotor 51 which includes not only a plurality of crank angle detecting projections 51a provided at every given crank angles (in the present embodiment, since the engine 1 is a four-cylinder engine, the projections 51a are provided at 90° intervals 10° CA before the compression top dead centers of the respective cylinders (180° CA), but also a cylinder discriminating projection 51b provided at a given angle after the compression top dead center of a given cylinder (#1 cylinder) (20° CA). At a position opposed to the signal rotor 51, there is disposed a cam angle sensor 52 which is formed of an electromagnetic pickup or the like and is used not only to detect the crank angle but also to discriminate cylinders.

And, as the engine 1 runs, the cam shaft 3 and signal rotor 51 are respectively rotated, the respective projections of the signal rotor 51 are detected by the cam angle sensor 52. And, from the cam angle sensor 52, there are outputted θ1 pulses by the crank angle detecting projections 51a and a θ2 pulse by the cylinder discriminating projection 51b respectively to the ECU 60.

Then, the ECU 60 calculates an engine revolution number Ne in accordance with the input time intervals of the θ1 pulses input from the cam angle sensor 52, and also discriminates the cylinders in accordance with the input patterns of the θ2 pulse and θ1 pulses.

Also, in the continuously variable transmission 29, there is disposed a primary pulley revolution number sensor 53 for detecting a primary pulley revolution number NPO in such a manner that the sensor 53 is opposed to the primary pulley 30; and, there is disposed a secondary pulley revolution number sensor 54 for detecting a secondary pulley revolution number NSO in such a manner that the sensor 54 is opposed to the secondary pulley 31.

Figure 3:
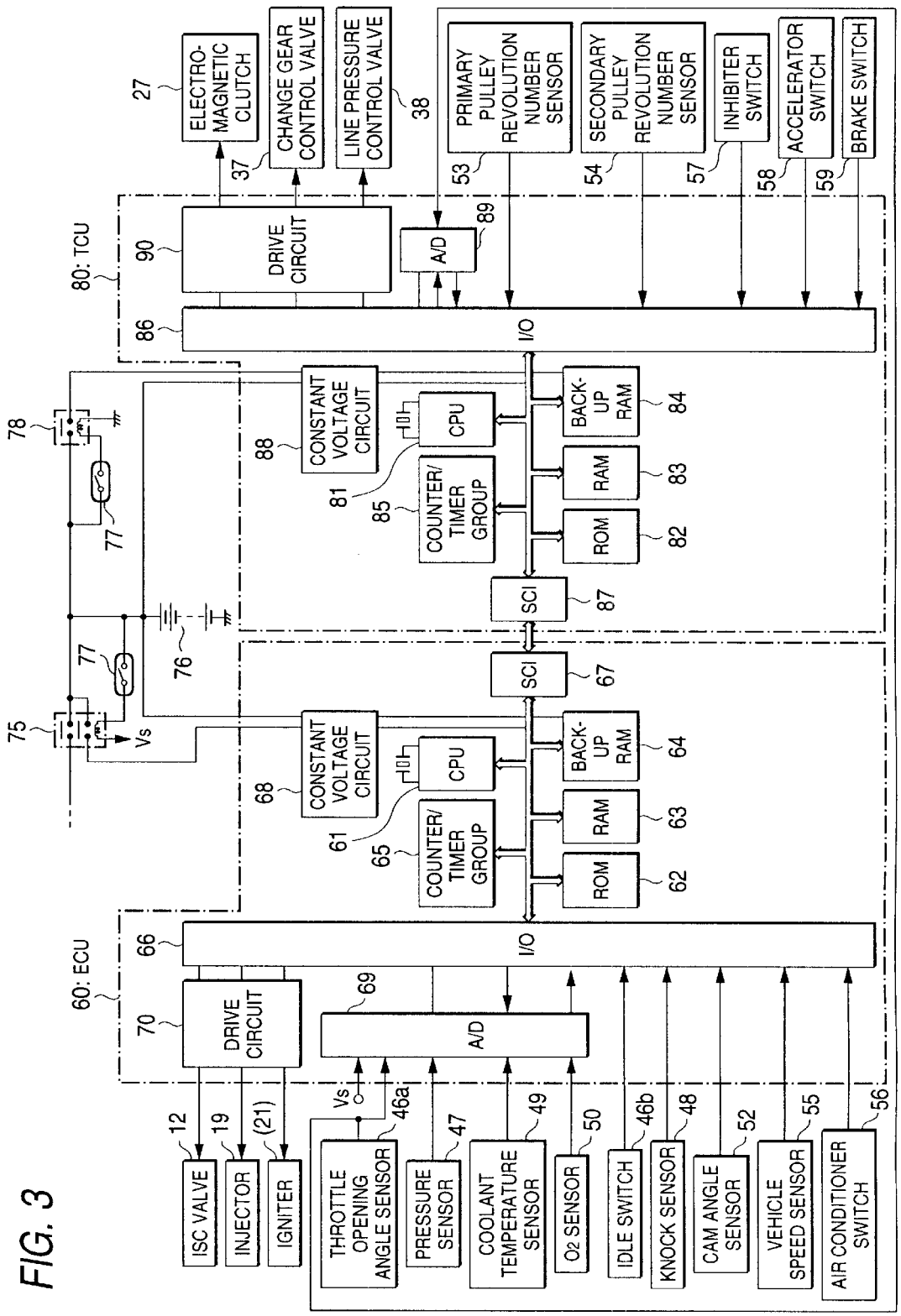
FIG. 3 is a circuit diagram of a control system employed in the first embodiment.

Next, a description will be given below of the ECU 60 for controlling the engine 1 and the TCU 80 for controlling the electromagnetic clutch 27 and continuously variable transmission 29 with reference to FIG. 3.

The ECU 60 calculates control amounts and outputs control signals on various actuators such as the above-mentioned injector 19, ignition plug 20, ISC valve 12 and the like; that is, the ECU 60 carries out fuel injection control, ignition timing control, idle revolution number control and the like. As shown in FIG. 3, the ECU 60 is mainly composed of a microcomputer comprising a CPU 61, a ROM 62, a RAM 63, a back-up RAM 64, a counter/timer group 65, an I/O interface 66, and a communication interface (SCI) 67 which are connected together by bus lines; and, in the ECU 60, there are further incorporated peripheral circuits such as a constant voltage circuit 68 for supplying a stabilized power source to the respective components of the ECU 60, an A/D converter 69 to be connected to the I/O interface 66, a drive circuit 70 and the like.

By the way, the above-mentioned term "counter/timer group 65" is a generic term used for convenience's sake. That is, the counter/timer group 65 includes not only various counters such as a free-run counter and the like, but also various timers such as a fuel injection timer, an ignition timer, a periodic interrupt timer for generating periodic interrupts, an input interval timing timer for timing the input intervals of the cam angle sensor signals (θ1 pulses), a watch dog timer for monitoring system failures, and the like; and, besides the above, there can also be used various software counter/timers.

The constant voltage circuit 68 is connected to a battery 76 through the first relay contact of a power relay 75 including two-circuit relay contacts. Also, the power relay 75 is structured such that one end of a relay coil thereof is connected to the battery 76 through an ignition switch 77, while the other end of the relay coil is connected to the A/D converter 69 of the ECU 60. By the way, to the second relay contact of the power relay 75, there is connected a power line for supplying the power to the respective actuators from the battery 76.

Further, the constant voltage circuit 68 is connected directly to the battery 76 and is structured in the following manner: that is, if the ignition switch 77 is turned on to thereby close the relay contact of the power relay 75, then the constant voltage circuit 68 supplies the power to the respective components of the ECU 60; and, regardless of on and off of the ignition switch 77, the constant voltage circuit 68 always supplies the back-up power to the back-up RAM 64.

To the input ports of the I/O interface 66, there are connected the idle switch 46b, knock sensor 48, cam angle sensor 52, a vehicle speed sensor 55 for detecting the speed of the vehicle, and an air conditioner switch 56 for detecting the operation of an air conditioner. Also, to the input ports of the I/O interface 66, through the A/D converter 69, there are connected the throttle opening angle sensor 46a, pressure sensor 47, engine coolant sensor 49 and $O_2$ sensor 50; and, there is input and monitored a battery voltage VB which is input through the ignition switch 77 and the relay coil of the power relay 75.

Also, to the output ports of the I/O interface 66, there are connected the ISC valve 12, injector 19, and the igniter of the ignition coil 21 with an igniter incorporated therein.

In addition, to the output ports of the I/O interface 66, there are further connected the SCI 67 of the ECU 60 and the SCI 87 of the TCU 80 respectively through bus lines, whereby the I/O interface 66, ECU 60 and TCU 80 can read therein data necessary for calculation of the abovementioned various control amounts through two-way communication between them.

The ECU 60, in accordance with control programs stored in the ROM 62, allows the CPU 61 to process the detect signals input through the I/O interface 66 from the sensors and switches as well as the battery voltage VB and the like; and, at the same time, in accordance with various kinds of data stored in the RAM 63, data written therein from the TCU 80 through the SCI 67 as the need arises, various learning value data stored in the back-up RAM 64, fixed data stored in the ROM 62, and the like, the ECU 60 calculates the fuel injection amount, ignition timing, the duty ratio of the control duty signal to the ISC valve 12 and the like, to thereby exercise the engine control such as the fuel injection control, ignition timing control, idle revolution number control and the like.

On the other hand, the TCU 80 calculates control current values and outputs control signals (control currents) with respect to the above-mentioned electromagnetic clutch 27, change gear control valve 37, and line pressure control valve 38; that is, the TCU 80 exercises not only clutch control but also change gear control and line pressure control on the continuously variable transmission 29. The TCU 80, similarly to the ECU 60, consists mainly of a computer comprising a CPU 81, a ROM 82, a RAM 83, a back-up RAM 84, a counter/timer group 85, an I/O interface 86, and a communication interface (SCI) 87 which are connected together by bus lines; and, in the TCU 80, there are further incorporated peripheral circuits such as a constant voltage circuit 88 for supplying a stabilized power source to the respective components of the TCU 80, an A/D converter 89 to be connected to the I/O interface 86, a drive circuit 90 and the like.

The constant voltage circuit 88 is connected to the battery 76 through the relay contact of a power relay 78. Also, the power relay 78 is structured such that one end of a relay coil thereof is connected to the battery 76 through an ignition switch 77, while the other end of the relay coil is grounded.

Further, the constant voltage circuit 88 is connected directly to the battery 76 and is structured in the following manner: that is, if the ignition switch 77 is turned on to thereby close the relay contact of the power relay 78, then the constant voltage circuit 88 supplies the power to the respective components of the TCU 80; and, regardless of on and off of the ignition switch 77, the constant voltage circuit 88 always supplies the back-up power to the back-up RAM 84.

To the input ports of the I/O interface 86, there are connected the primary revolution number sensor 53, secondary revolution number sensor 54, an inhabiter switch 57 for detecting a range selected by a select lever (not shown), an accelerator switch 58 for detecting an accelerator pedal operation, and a brake switch 59 for detecting the pressing-down of the brake pedal 16. Also, to one of the input ports of the I/O interface 86, through an A/D converter 89, there is connected the throttle opening angle sensor 46a.

Also, to the output ports of the I/O interface 86, there are connected a clutch coil 27c of an electromagnetic clutch 27 as well as two solenoids 37a and 38a which are respectively included in a change gear control valve 37 and a line pressure control valve 38.

And, the TCU 80, in accordance with control programs stored in the ROM 82, allows the CPU 81 to process detect signals input therein through the I/O interface 86 from the sensors and switches; and, at the same time, in accordance with various data stored in the RAM 83, data written therein through the SCI 87 from the ECU 60 as the need arises, various learning value data stored in the back-up RAM 84, and, fixed data stored in the ROM 82, the TCU 80 calculates a control current value with respect to the clutch coil 27c of the electromagnetic clutch 27 as well as control current values with respect to the respective solenoids 37a and 38a of the change gear control valve 37 and line pressure control valve 38 to thereby exercise various kinds of transmission control such as clutch control, change gear control with respect to the continuously variable transmission 29, line pressure control, and the like.

Here, the duty ratio of a control duty signal with respect to the ISC valve 12 inserted in the bypass passage 11 for bypassing the throttle valve 8a of the engine 1 set by the ECU 60, as known well, is set in accordance with the engine coolant temperature Tw. When the engine coolant temperature Tw is less than a first set value which shows a given engine cool condition, the basic control duty ratio is set to the maximum value, with the result that the opening angle of the ISC valve 12 increases to thereby increase the ISC valve passing air flow amount. And, during the engine warm-up operation on the way to the completely warmed condition of the engine, as the engine coolant temperature Tw rises from the first set value up to a second set value which can be regarded as an indication that the engine warm-up is completed, the basic control duty ratio is gradually reduced, so that the opening angle of the ISC valve 12 decreases gradually and thus the ISC valve passing air flow amount decreases gradually. And, when the engine coolant temperature Tw is equal to or greater than the second set value and thus it can be regarded that the engine is in a completely warmed condition, the basic control duty ratio is set to the minimum value and thus the ISC valve passing air flow amount becomes small in correspondence to the small opening angle of the ISC valve 12.

Also, in the vehicle running operation, if the engine 1 is directly connected to the continuously variable transmission 29 by the electromagnetic clutch 27, then the engine revolution number Ne corresponds to the primary pulley revolution number. And, in deceleration due to the full-closed condition of the throttle valve 8a, due to a brake force given from the driving wheel 35 side, the engine revolution number Ne depends on the revolution number of the primary pulley 30 of the continuously variable transmission 29 connected to the crankshaft 26 of the engine 1.

Figure 11:
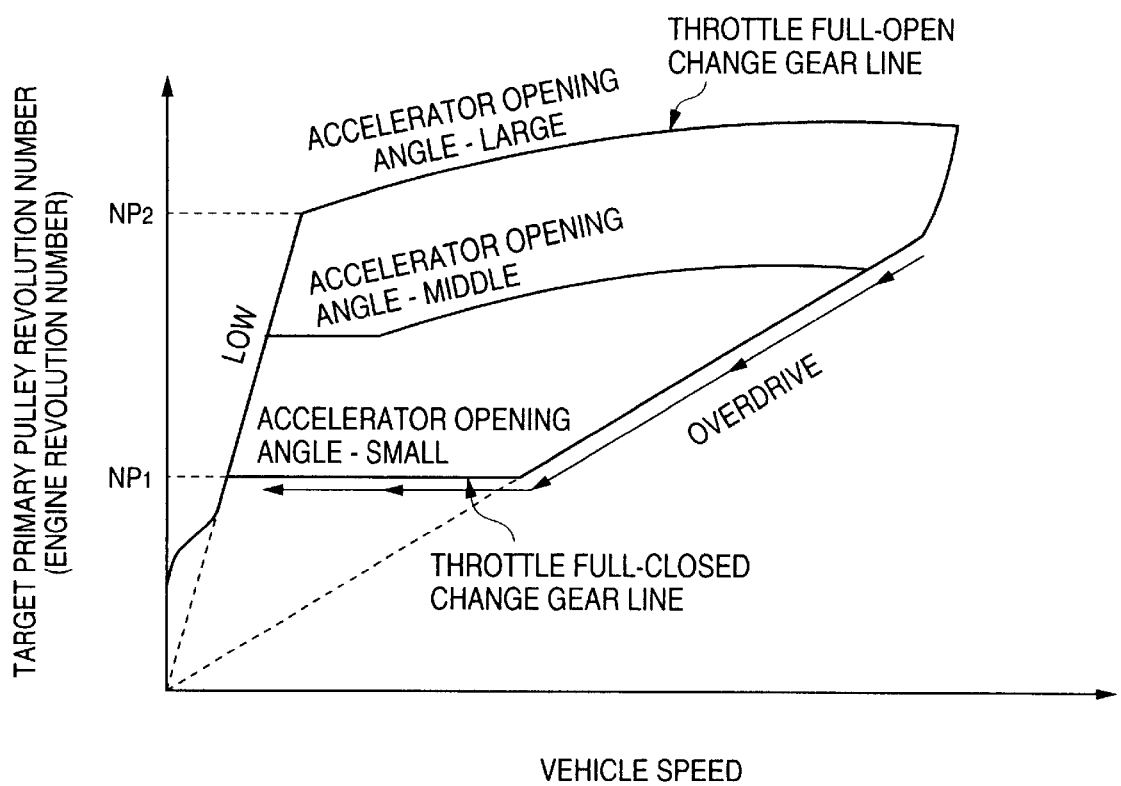

Therefore, during the engine warm-up operation on the way to the completely warmed condition including an engine 1 cool condition, even if the throttle valve 8a is full closed, the ISC valve 12 passing air flow amount increases to thereby increase the supply air flow amount to the engine 1; and, the throttle full-closed change gear line of a basic change gear characteristic map (see FIG. 11) given in the change gear control of the TCU 80 with respect to the continuously variable transmission 29, as described above, is set on the low revolution number side for improvement in the fuel consumption and running performance of the vehicle, so that, in the throttle valve full-closed condition, the revolution number of the primary pulley 30 decreases to thereby decrease the engine revolution number Ne. That is, for the above two reasons in combination, in deceleration due to the full-closed condition of the throttle valve 8a, the intake pipe negative pressure is hard to occur downstream of the throttle valve 8a.

As a result, in deceleration during the engine warm-up operation on the way to the engine completely warmed condition including an engine 1 cool condition, even if the throttle valve 8a is closed full, the intake pipe negative pressure downstream of the throttle valve 8a runs short, which reduces the assist force by the master back 15 to thereby lower the holding performance of the brakes.

In brief, in the present embodiment, the basic control duty ratio of the control duty signal to the ISC valve 12, which determines the opening angle of the ISC valve 12 corresponding to the ISC valve passing air flow amount, is set in accordance with the engine coolant temperature Tw, the engine revolution number Ne in deceleration depends on the primary pulley revolution number, and the opening angle of the ISC valve 12 deciding the ISC valve passing air flow amount, which gives rise to a shortage of the intake pipe pressure downstream of the throttle valve 8a in the throttle valve full-closed condition, depends on the engine coolant temperature Tw. Therefore, according to the present embodiment, in the change gear control of the TCU 80 on the continuously variable transmission 29, when setting a target primary pulley revolution number according to the basic change gear characteristic map, a throttle opening angle guard value THRG specifying the throttle full-closing change gear line is set in accordance with the engine coolant temperature Tw.

And, an actual throttle opening angle THRO is compared with the throttle opening angle guard value THRG, and larger one of them is set as a change gear ratio calculating throttle opening angle THR; and, the basic change gear characteristic map is referred to with the change gear ratio calculating throttle opening angle THR and vehicle speed V as parameters, thereby setting the target primary pulley revolution number NP which decides a target change gear ratio is.

Thanks to this, even during the engine warm-up operation on the way to the engine completely warmed condition including an engine cool condition where the passing air flow amount by the ISC valve 12 increases, in deceleration due to the full-closed condition of the throttle valve 8a, the throttle full-closed change gear line can be properly shifted to the high revolution number side in correspondence to an increase in the passing air flow amount by the ISC valve 12 and, due to the following control of the actual primary pulley revolution number NPo relative to the target primary pulley revolution number NP, the revolution number Ne of the engine 1 connected to the primary pulley 30 can be increased accurately in correspondence to an increase in the passing air flow amount by the ISC valve 12. As a result, in deceleration due to the full-closed condition of the throttle valve 8a, an increase in the engine revolution number Ne makes it possible to secure the intake pipe negative pressure downstream of the throttle valve 8a properly, regardless of a difference between the ISC valve 12 passing air flow amounts resulting from a difference between the engine coolant temperatures Tw. Thus, even during the engine warm-up operation on the way to the engine completely warmed condition including an engine cool condition where the passing air flow amount by the ISC valve 12 increases, in deceleration due to the full-closed condition of the throttle valve 8a, a proper intake pipe negative pressure can be secured downstream of the throttle valve 8a to thereby enhance the assist force of the master back 15 that uses the intake pipe negative pressure as the power source thereof, which makes it possible to secure a proper brake force.

In other words, the TCU 80 is able to realize the respective functions of the throttle opening angle guard value setting means, throttle opening angle comparing means, change gear ratio calculating throttle opening angle setting means, and target primary pulley revolution number setting means according to the invention.

Figure 4:
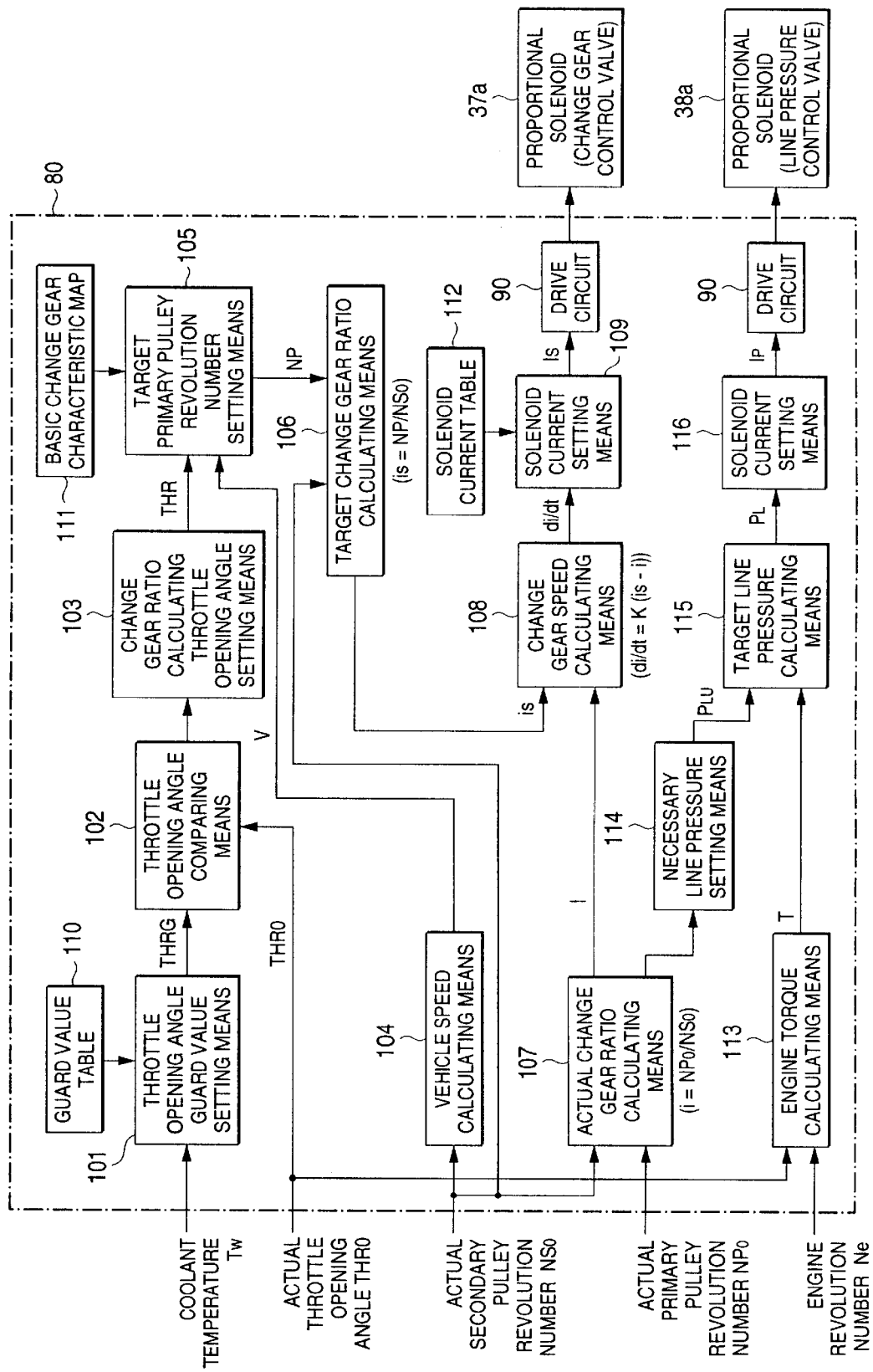
FIG. 4 is a block diagram of the functional structure of a transmission control system employed in the first embodiment.

Next, a description will be given below of the functional structure of the TCU 80 that is the gist of the invention, with reference to FIG. 4 which is a functional block diagram of the TCU 80.

TCU 80 sets a control current value (solenoid current) with respect to the solenoid 37a of the change gear control valve 37 in accordance with the vehicle speed, throttle opening angle or the like, and the oil pressure cylinder 30b of the primary pulley 30 is operated by a primary pressure Pp generated by the change gear control valve 37 according to the thus set solenoid current to thereby be able to obtain the optimum change gear ratio corresponding to a vehicle running condition determined by the vehicle speed, throttle opening angle and the like. Therefore, the TCU 80, as shown in FIG. 4, includes, as a change gear control system thereof, throttle opening angle guard value setting means 101, throttle opening angle comparing means 102, change gear ratio calculating throttle opening angle setting means 103, vehicle speed calculating means 104, target primary pulley revolution number setting means 105, target change gear ratio calculating means 106, actual change gear ratio calculating means 107, change gear speed calculating means 108, and solenoid current setting means 109 which are all function means. And, the TCU 80 further includes various tables, maps, such as a throttle opening angle guard value table 110, a basic change gear characteristic map 111, a solenoid current table 112, and the like.

Also, TCU 80 sets a control current value (solenoid current) with respect to the solenoid 38a of the line pressure control valve 38 in accordance with an actual change gear ratio, an engine torque and the like, a line pressure PL generated by the line pressure control valve 38 in correspondence to the thus set solenoid current is given to the change gear control valve 37 as a base pressure, and the line pressure PL is also supplied to the oil pressure cylinder 31b of the secondary pulley 31 to thereby be able to give the secondary pulley 31 the optimum pressure which allows the secondary pulley 31 to transmit an engine torque through its contact with the drive belt 32. Therefore, the TCU 80 includes, as a line pressure control system thereof, engine torque calculating means 113, necessary line pressure setting means 114, target line pressure setting means 115, and solenoid setting means 116 which are respectively functional means.

Now, a description will be given below of the above-mentioned respective functional means of the TCU 80. At first, the throttle opening angle guard value setting means 101 reads therein the engine coolant temperature Tw given by the engine coolant temperature sensor 49 from the ECU 60 through the respective SCIs 87 and 67, refers to the throttle opening angle guard value table 110 with interpolation in accordance with the thus read engine coolant temperature Tw, and, when referring to the basic change gear characteristic map 111, sets the throttle opening angle guard value THRG which specifies the throttle full-closed change gear line.

Here, a description will be given below of the throttle opening angle guard value table 110. In deceleration due to the full-closed condition of the throttle valve 8a during the engine warm-up operation on the way to the engine completely warmed condition including an engine cool condition, the throttle full-closing change gear line is properly moved to the high revolution number side in correspondence to an increase in the passing air flow amount by the ISC valve 12 while referring to the basic change gear characteristic map with the engine coolant temperature Tw as a parameter, thereby increasing the engine revolution number; and, throttle opening angles suitable for securing the intake pipe negative pressure as the power source of the master back 15 are previously obtained by simulation or by experiment, and the thus obtained throttle opening angles are set as the throttle opening angle guard values THRG. After then, there is formed a table which contains therein the thus set throttle opening angle guard values THRG with the engine coolant temperatures Tw as the parameters thereof, and the table is stored into the ROM 82. That is, this table provides the throttle opening angle guard value table 110.

Figure 5:
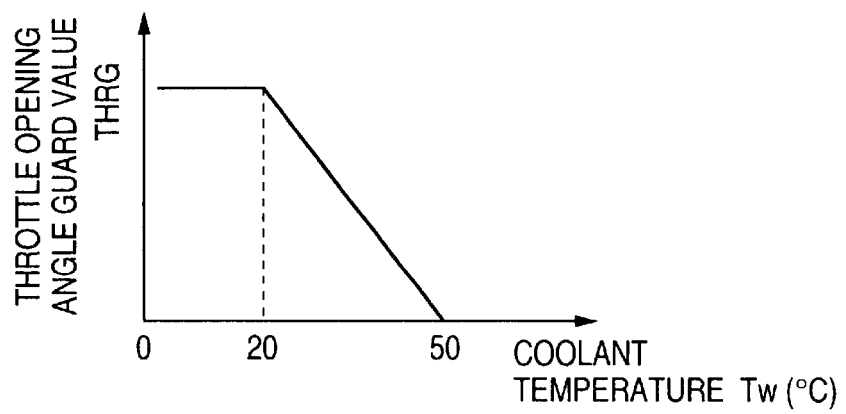
FIG. 5 is an explanatory view of a throttle opening angle guard value table employed in the first embodiment.

Now, in FIG. 5, there is shown an example of the throttle opening angle guard value table 110. As described before, the basic control duty ratio of the control duty signal to the ISC valve 12, which determines the opening angle of the ISC valve 12 corresponding to the ISC valve passing air flow amount, is set in accordance with the engine coolant temperature Tw. When the engine coolant temperature Tw is lower than a first set value indicating a given engine cool condition (in the present embodiment, for example, 20° C.), the basic control duty ratio is set to the maximum value, so that the opening angle of the ISC valve 12 increases to thereby increase the ISC valve passing air flow amount. And, in the engine warm-up operation on the way to the completely warmed condition of the engine, as the engine coolant temperature Tw rises from the first set value up to a second set value indicating the completion of the engine warm-up operation (in the present embodiment, for example, 50° C.), the basic control duty ratio decreases gradually to thereby reduce the opening angle of the ISC valve 12 gradually, so that the ISC valve passing air flow amount decreases gradually. Also, when the engine coolant temperature Tw is equal to or higher than the second set value and thus it can be regarded that the warm-up operation of the engine 1 is completed (engine completely warmed condition), the basic control duty ratio is set to the minimum value to thereby reduce the opening angle of the ISC valve 12, so that the ISC valve passing air flow amount becomes small in correspondence to the reduced opening angle of the ISC valve 12.

Therefore, in correspondence to this, the throttle opening angle guard value THRG to be stored into the throttle opening angle guard value table 110 is set to a given value on the throttle opening side in order that, in an area where the engine coolant temperature Tw is less than the first set value indicating an engine cool condition (for example, 20° C.), the throttle full-closed change gear line according to the basic change gear characteristic can be shifted to the high revolution number side in correspondence to an increase in the ISC valve passing air flow amount and, in deceleration due to the full-closed condition of the throttle valve 8a, the target primary pulley revolution number can be increased to thereby increase the engine revolution number Ne. Further, the ISC valve passing air flow amount decreases gradually as the engine coolant temperature Tw rises from the first set value up to the second set value (for example, 50° C.) that can be regarded as the completion of the engine warm-up operation. Thus, the throttle opening angle guard value THRG is set in such a manner that it decreases gradually as the engine cooling water temperature Tw rises, in order to decrease an amount of an increase in the target primary pulley revolution number in deceleration due to the full-closed condition of the throttle valve 8a, thereby being able to control an increase in the engine revolution number Ne. Moreover, in an area where the engine coolant temperature Tw is set equal to or higher than the second set value that can be regarded as the indication of the engine completely warmed-up condition, the ISC valve passing air flow amount becomes small and thus the influence of the ISC valve passing air flow amount on the intake pipe negative pressure downstream of the throttle valve 8a can be neglected. Therefore, the throttle opening angle guard value THRG is set to the throttle valve full-closed opening angle that corresponds to no guard.

By the way, in the present embodiment, the throttle opening angle guard value THRG is given from the table with the engine coolant temperature Tw as the parameter and thus the throttle opening angle guard value THRG is set by retrieving the table. However, this is not limitative but, according to the invention, it is also possible to employ another setting system. For example, a throttle opening angle guard value may be given from a functional equation of the engine coolant temperature Tw, and a throttle opening angle guard value calculated from the functional equation may be restricted in the upper and lower limits thereof to thereby set the throttle opening angle guard value THRG.

Now, the throttle opening angle comparing means 102 compares an actual throttle opening angle THRO detected by the throttle opening angle sensor 46a with the throttle opening angle guard value THRG.

And, the change gear ratio calculating throttle opening angle setting means 103, in accordance with the comparison result by the throttle opening angle comparing means 102, sets larger one of the actual throttle opening angle THRO and throttle opening angle guard value THRG as a change gear ratio calculating throttle opening angle THR.

The vehicle speed calculating means 104 calculates a vehicle speed V from an actual secondary pulley revolution number NSo calculated in accordance with the output signal of the secondary pulley revolution number sensor 54, a reduction ratio given by the final reduction gear group 33 and differential gear 34, and the effective diameter of the driving wheel 35. By the way, the reduction ratio given by the final reduction gear group 33 and differential gear 34, and the effective diameter of the driving wheel 35 are previously stored in the ROM 82 as fixed data.

And, the target primary pulley revolution number setting means 105 refers to the basic change gear characteristic map 111 stored in the ROM 82 with the change gear ratio calculating throttle opening angle THR and vehicle speed V as parameters, thereby setting a target primary pulley revolution number NP which decides a target change gear ratio is.

Figure 6:
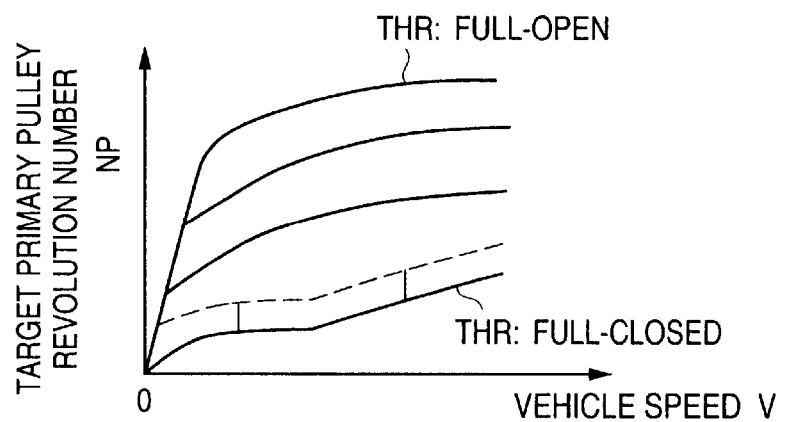
FIG. 6 is an explanatory view of a basic change gear characteristic map employed in the first embodiment.

Now, FIG. 6 shows an example of the basic change gear characteristic map. Here, during an engine warm-up operation on the way to the engine completely warmed condition including an engine cool condition, for the full-closed opening angle of the throttle valve 8a, the throttle opening angle guard value THRG is set to a value on the throttle valve opening side in correspondence to the engine coolant temperature Tw.

Therefore, in deceleration due to the full-closed condition of the throttle valve 8a during an engine warm-up operation on the way to the engine completely warmed condition including an engine cool condition, the relation between the actual throttle opening angle THRO and throttle opening angle guard value THRG provides THRO<THRG, and the change gear ratio calculating throttle opening angle THR is set in accordance with the throttle opening angle guard value THRG. Therefore, the basic change gear characteristic map is referred to with the throttle opening angle guard value THRG offset on a given throttle valve opening side as a parameter.

Thanks to this, even during an engine warm-up operation on the way to the engine completely warmed condition including an engine cool condition, in deceleration due to the full-closed condition of the throttle valve 8a, the throttle full-closed change gear line, as shown by a broken line in FIG. 6, can be moved to the high revolution number side properly in correspondence to an increase in the ISC valve 12 passing air flow amount.

And, due to the control functions that are respectively carried out by the target change gear ratio calculating means 106, actual change gear ratio calculating means 107, change gear speed calculating means 108, and solenoid current setting means 109 which will be respectively discussed later in detail, the actual primary pulley revolution number NPo is controlled in such a manner to follow after the target primary pulley revolution number NP. Thanks to this following control, the revolution number Ne of the engine 1 connected to the primary pulley 30 can be increased accurately in correspondence to an increase in the passing air flow amount by the ISC valve 12. As a result of this, in deceleration due to the full-closed condition of the throttle valve 8a, the increase in the engine revolution number Ne makes it possible to secure proper intake pipe negative pressure downstream of the throttle valve 8a, regardless of a difference between the ISC valve 12 passing air flow amounts resulting from a difference between the engine coolant temperatures Tw. Thus, even during the engine warm-up operation on the way to the engine completely warmed condition including an engine cool condition where the passing air flow amount by the ISC valve 12 increases, in deceleration due to full-closed condition of the throttle valve 8a, the intake pipe negative pressure can be properly secured downstream of the throttle valve 8a to thereby enhance the assist force of the master back 15 that uses the intake pipe negative pressure as the power source thereof, which makes it possible to secure a proper brake force.

The target change gear ratio calculating means 106 calculates the target change gear ratio is (is=NP/NSo) from a ratio between the target primary pulley revolution number NP and actual secondary pulley revolution number NSo.

Also, the actual change gear ratio calculating means 107 calculates an actual change gear ratio i (i=NPo/NSo) from a ratio between the actual secondary pulley revolution number NSo and an actual primary pulley revolution number NPO obtained in accordance with the output signal of the primary pulley revolution number sensor 53.

And, the change gear speed calculating means 108 calculates a change gear speed di/dt for letting the actual change gear ratio i converge to the target change gear ratio is according to the following equation.

$$di/dt = K(is-i);$$

where K is a coefficient.

By the way, the positive and negative signs of the change gear speed di/dt determine the shift-up and shift-down of the change gear speed respectively.

The solenoid current setting means 109 refers to the solenoid current table 112 in accordance with the change gear speed di/dt and sets a solenoid current value Is with respect to the solenoid 37a of the change gear control valve 37, while the solenoid current value Is is used to determine the control amount of the change gear control valve 37 necessary to obtain a proper primary pressure Pp which is used to obtain the present change gear speed di/dt.

Figure 7:
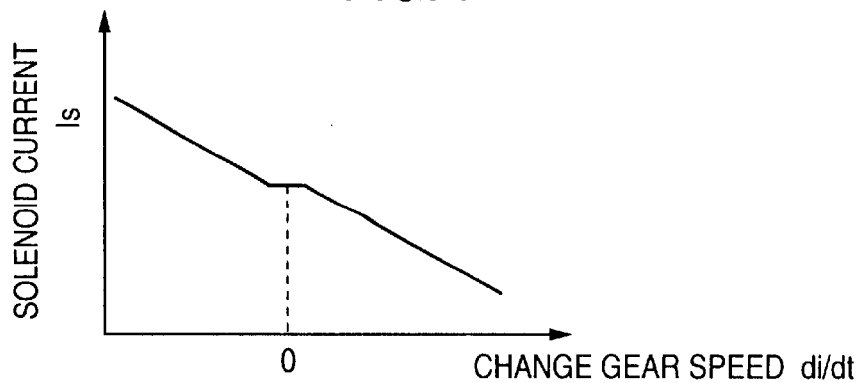
FIG. 7 is an explanatory view of a solenoid current table employed in the first embodiment.

Now, in FIG. 7, there is shown an example of the solenoid current table 112. The solenoid current table 112 can be produced in the following manner. That is, current values with respect to the solenoid 37a of the change gear control valve 37, which can be used to obtain a proper primary pressure Pp necessary to find the change gear speed di/dt, are previously found by simulation or by experiment, the thus found current values are set as solenoid current values Is and, with the change gear speed di/dt as a parameter, the thus set solenoid current values Is are stored in the form of a table into the ROM 82. That is, this table is referred to as the solenoid current table 112.

Here, the solenoid current values Is are set in such a manner as shown in FIG. 7: that is, as the change gear speed di/dt increases on the plus side, the solenoid current values Is are set in a descending manner; and, as the change gear speed di/dt increases on the minus side, the solenoid current values Is are set in an ascending manner.

In other words, when the change gear speed di/dt(=K(is−i)) is on the plus side, the actual change gear ratio i is smaller than the target change gear ratio is and the actual primary pulley revolution number NPo is lower than the target primary pulley revolution number NP. Therefore, in order to be able to raise the primary pressure Pp to be supplied to the oil pressure cylinder 30b of the primary pulley 30 and to increase the actual primary pulley revolution number NPo by means of shift-up, the solenoid current values Is with respect to the solenoid 37a of the change gear control valve 37 are set in a decreasing manner.

Also, in contrast to the above, when the change gear speed di/dt is on the minus side, the actual change gear ratio i is larger than the target change gear ratio Ls, and the actual primary pulley revolution number NPo is higher than the target primary pulley revolution number NP. Therefore, in order to be able to reduce the primary pressure Pp to be supplied to the oil pressure cylinder 30b of the primary pulley 30 and to decrease the actual primary pulley revolution number NPo by means of shift-down, the solenoid current values Is with respect to the solenoid 37a of the change gear control valve 37 are set in an increasing manner.

And, a solenoid current according to the thus set solenoid current values Is is output through a drive circuit 90 to the solenoid 37a of the change gear control valve 37.

As a result of this, due to the pressure control action on the primary pressure Pp by the change gear control valve 37 in correspondence to the solenoid current value Is, oil of a given primary pressure Pp is supplied to the oil pressure cylinder 30b of the primary pulley 30 and, due to the operation of the oil pressure cylinder 30b, the actual primary pulley revolution number NPo is controlled in such a manner that it follows the target primary pulley revolution number NP.

Next, a description will be given below of the line pressure control system. The engine torque calculating means 113 reads therein the engine revolution number Ne from the ECU 60 through the SCIs 87 and 67 and, in accordance with the engine revolution number Ne and the above-mentioned actual throttle opening angle THRO, finds an engine torque T by referring to a map or the like.

Also, the necessary line pressure setting means 114, in accordance with the actual change gear ratio i, sets a necessary line pressure PLU per unit torque by table retrieval or by calculation.

And, the target line pressure calculating means 115 multiplies the necessary line pressure PLU by the engine torque T to thereby find a target line pressure PL(PL=PLU×T).

The solenoid current setting means 116 sets a solenoid current value Ip with respect to the solenoid 38a of the line pressure control valve 38, while the solenoid current value Ip can be used to determine the control amount of the line pressure control valve 38 which is proper to obtain the target line pressure PL. And, a solenoid current according to the thus solenoid current value Ip is output through a drive circuit 90 to the solenoid 38a of the line pressure control valve 38.

As a result of this, due to the pressure control action on the line pressure PL by the line pressure control valve 38 in correspondence to the solenoid current value Ip, the line pressure $P_L$ is controlled in such a manner that it follows after the target line pressure PL, and oil of a given line pressure $P_L$ is supplied to the oil pressure cylinder 31b of the secondary pulley 31. The oil pressure cylinder 31b gives the secondary pulley 31 a proper pressure which corresponds to the running condition of the vehicle and is capable of transmitting a torque through contact with the drive belt 32.

By the way, the line pressure control processing is well known by Japanese Patent Unexamined Publication No. 7-317863 of Heisei applied by the present applicants and thus the detailed description is omitted here.

Figure 8:
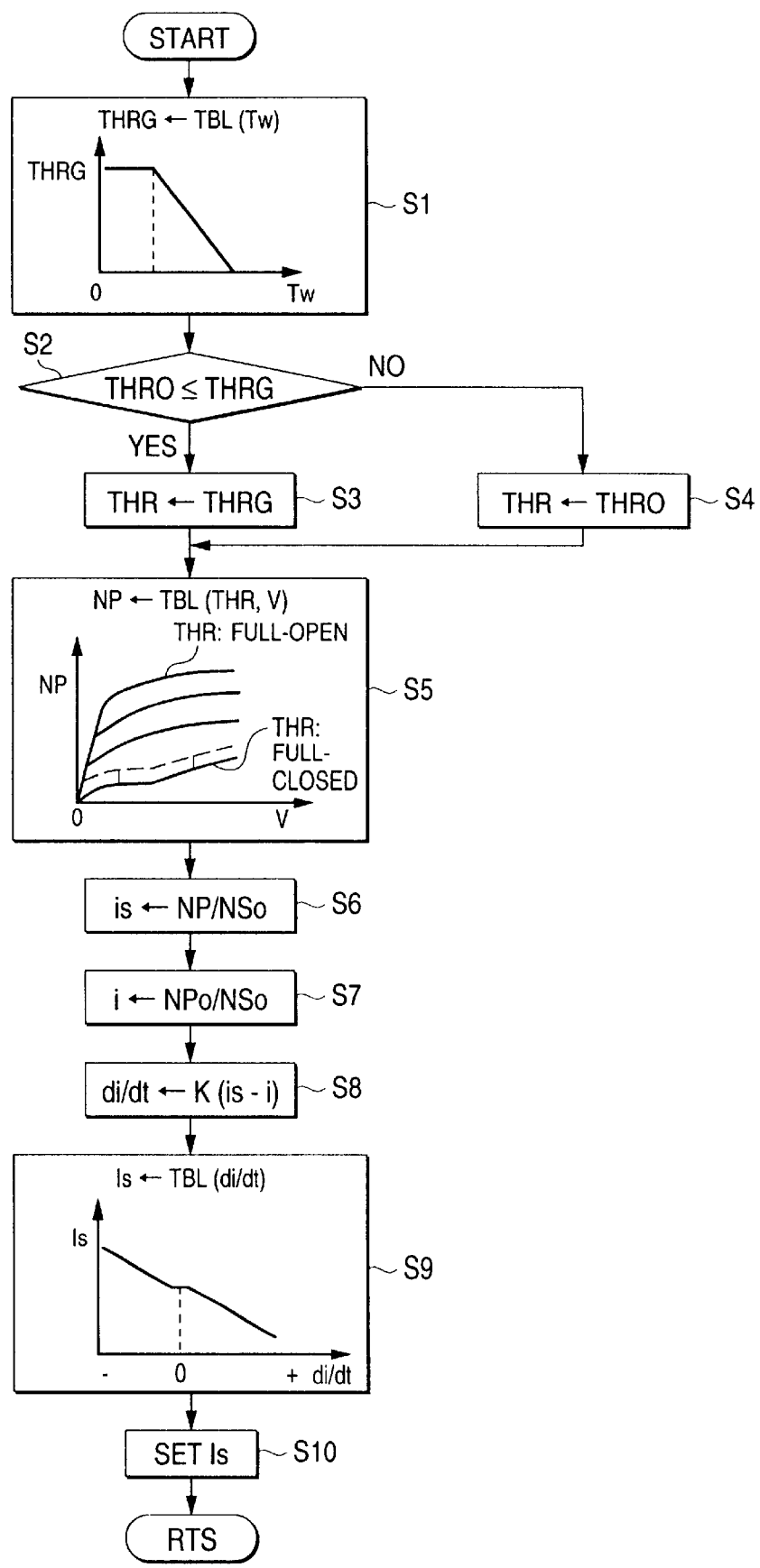
FIG. 8 is a flow chart of a change gear control routine employed in the first embodiment.

Here, the change gear control processing by the TCU 80, specifically, can be realized according to a change gear control routine shown in a flow chart of FIG. 8.

The change gear control routine is executed every given cycle (for example, every 20 msec.). At first, in Step S1, an engine coolant temperature Tw given by the engine coolant temperature sensor 49 is read through the SCIs 87 and 67 from the ECU 60, the throttle opening angle guard value table 110 is referred to with interpolation in accordance with the thus read engine coolant temperature Tw, and, while referring to the basic change gear characteristic map 111, there is set the throttle opening angle guard value THRG which specifies the throttle full-closed change gear line.

Next, in Step S2, the throttle opening angle guard value THRG is compared with the actual throttle opening angle THRO that is detected by the throttle opening angle sensor 46a.

And, if THRO<THRG, then the processing goes to Step S3, where the change gear ratio calculating throttle opening THR is set in accordance with the throttle opening angle guard value THRG (THR←THRG). Also, if THRO>THRG, then the processing goes to Step S4, where the change gear ratio calculating throttle opening THR is set in accordance with the actual throttle opening angle THRO (THR←THRO) and, after then, the processing advances to Step S5.

In step S5, with the change gear ratio calculating throttle opening THR and vehicle speed V as parameters, the basic change gear characteristic map 111 stored in the ROM 82 is referred to set the target primary pulley revolution number NP which determines the target change gear ratio is.

And, in Steps S6 and S7, from the target primary pulley revolution number NP, actual primary pulley revolution number NPo and actual secondary pulley revolution number NSo, there are calculated the target change gear ratio is and actual change gear ratio i respectively (is NP←NSo, i←NP/NSo). Next, in Step S8, a difference between the target change gear ratio is and actual change gear ratio i is multiplied by a coefficient K to thereby calculate the change gear speed di/dt which lets the actual change gear ratio i converge to the target change gear ratio is (di/dt←K(is−i)).

Then, in Step S9, by referring to the solenoid current table 112 in accordance with the change gear speed di/dt, there is found the solenoid current value Is with respect to the solenoid 37a of the change gear control valve 37, which determines the control amount of the change gear control valve 37 necessary to obtain a proper primary pressure Pp for finding the change gear speed di/dt. The thus found solenoid current value Is is set in Step S10, thereby ending this routine.

Thus, a solenoid current according to the solenoid current value Is is output through the drive circuit 90 from the TSU 80 to the solenoid 37a of the change gear control valve 37. As a result of this, due to the pressure control action on the primary pressure Pp by the change gear control valve 37 in correspondence to the solenoid current value Is, oil of a given primary pressure Pp is supplied to the oil pressure cylinder 30b of the primary pulley 30 and, due to the operation of the oil pressure cylinder 30b, the actual change gear ratio i is controlled in such a manner that it follows after the target change gear ratio is, and the actual primary pulley revolution number NPo is controlled in such a manner that it converges to the target primary pulley revolution number NP.

Here, as described above, in deceleration due to the full-closed condition of the throttle valve 8a, owing to a brake force from the driving wheel 35 side, the engine revolution number Ne depends on the actual primary pulley revolution number NPo of the primary pulley 30 of the continuously variable transmission 29 which is connected to the crankshaft 26 of the engine 1.

Also, as described above, the opening angle of the ISC valve 12, which determines the ISC valve passing air flow amount causing the shortage of the intake pipe pressure downstream of the throttle valve 8a in the full-closed condition of the throttle valve 8a, is set in accordance with the basic control duty ratio of the control duty signal with respect to the ISC valve 12, and also the basic control duty ratio is set in accordance with the engine coolant temperature Tw. Therefore, in the change gear control on the continuously variable transmission 29 by the TCU 80, when setting the target primary pulley revolution number NP according to the basic change gear characteristic map, the above-mentioned throttle opening angle guard value THRG specifying the throttle full-closed change gear line is, correspondingly to the above, set in accordance with the engine coolant temperature Tw.

And, the throttle opening angle guard value THRG is given as a proper throttle opening angle parameter which, when referring to the basic change gear characteristic map in deceleration due to the full-closed condition of the throttle valve 8a during the engine warm-up operation on the way to the completely warmed condition including the engine cool condition, can be properly used to move the throttle full-closed change gear line to the high revolution number side to thereby increase the engine revolution number and secure the intake pipe negative pressure serving as the power source of the master back 15.

Therefore, in deceleration due to the full-closed condition of the throttle valve 8a during the engine warm-up operation on the way to the engine completely warmed condition including the engine cool condition, since the actual throttle opening angle THRO detected by the throttle opening angle sensor 46a indicates the throttle valve full-closed opening angle, there is obtained a relation THRO≦THRG, and thus the change gear ratio calculating throttle opening angle THR used as a parameter when referring to the basic change gear characteristic map 111 is set in accordance with the throttle opening angle guard value THRG.

Thanks to this, even during the engine warm-up operation on the way to the engine completely warmed condition including the engine cool condition where the air flow amount allowed to pass by the ISC valve increases, in deceleration due to the full-closed condition of the throttle valve 8a, the throttle full-closed change gear line, which is referred to according to the basic change gear characteristic map, is shifted to the high revolution number side by the throttle opening angle guard value THRG, so that the target primary pulley revolution number NP is set in an increasing manner.

And, at the then time, the engine revolution number Ne depending on the actual primary pulley revolution number NPO is controlled in such a manner that it follows after the increasingly set primary pulley revolution number NP. Thus, even during the engine warm-up operation on the way to the engine completely warmed condition including the engine cool condition, in deceleration due to the full-closed condition of the throttle valve 8a, the engine revolution number Ne can be increased correctly in correspondence to an increase in the passing air flow amount by the ISC valve 12. Due to such increase in the engine revolution number Ne, regardless of a difference between the ISC valve 12 passing air flow amounts resulting from a different between the engine revolution numbers Ne, a proper intake pipe negative pressure can be secured downstream of the throttle valve 8a to thereby enhance the assist force of the master back 15 using the intake pipe negative pressure as the power source thereof, which eventually makes it possible to secure a proper brake force.

Also, as described above, when the engine coolant temperature Tw is lower than the first set value (in the present embodiment, for example, 20° C.) indicating an engine cool condition, the basic control duty ratio of the control duty signal with respect to the ISC valve 12 is set to the maximum value and the ISC valve passing air flow amount increases due to an increase in the opening angle of the ISC valve 12. Accordingly, in order that, in correspondence to the above, the throttle full-closed change gear line according to the basic change gear characteristic can be shifted to the high revolution number side and thus, in deceleration due to the full-closed condition of the throttle valve 8a, the target primary pulley revolution number NP can be increased to thereby increase the engine revolution number Ne, the throttle opening angle guard value THRG for shifting the target primary pulley revolution number NP due to the throttle full-closed change gear line to the high revolution number side is set at a given value on the throttle valve opening side.

And, during the engine warm-up operation on the way to the completely warmed condition of the engine, as the engine coolant temperature Tw rises from the first set value up to the second set value (in the present embodiment, for example, 50° C.) that can be regarded as the indication of the engine completely warmed-up condition, the basic control duty ratio decreases gradually, and the opening angle of the ISC valve 12 also decreases gradually, so that the ISC valve passing air flow amount decreases gradually. Therefore, in order to reduce the increase amount of the target primary pulley revolution number in deceleration due to the full-closed condition of the throttle valve 8a to thereby control an increase in the engine revolution number Ne, the throttle opening angle guard value THRG is set in such a manner that it gradually decreases according as the engine coolant temperature Tw rises.

And, when the engine coolant temperature Tw is equal to or higher than the second set value and thus the engine condition can be regarded as the completely warmed-up condition, the basic control duty ratio to be set in accordance with the engine coolant temperature Tw becomes the minimum value, the ISC valve passing air flow amount is decreased in correspondence to the opening angle of the ISC valve 12, and thus the influence of the passing air flow rate by the ISC valve 12 on the intake pipe negative pressure downstream of the throttle valve 8a can be neglected. Therefore, the throttle opening angle guard value THRG is set to the throttle valve full-closed opening angle which corresponds to no guard.

Therefore, even during an engine warm-up operation on the way to the completely warmed condition of the engine including an engine cool condition, in deceleration due to the full-closed condition of the throttle valve 8a, in correspondence to a difference between the ISC valve passing air flow amounts resulting from a difference between the engine coolant temperatures Tw, the target primary pulley revolution number NP given by the throttle full-closed change gear line of the basic change gear characteristic map can be optimally shifted to the high revolution number side by the throttle opening angle guard value THRG.

Thanks to this, by the following control of the actual primary pulley revolution number NPo after the target primary pulley revolution number NP, over the whole coolant temperature range, in correspondence to the difference between the passing air flow amounts permitted by the ISC valve 12, there can be obtained an engine revolution number Ne which is proper to obtain the intake pipe negative pressure downstream of the throttle valve 8a. For this reason, the engine revolution number Ne can be properly matched to the difference between the passing air flow amounts due to the difference between the continuous ISC valve opening angles corresponding to the engine coolant temperature Tw over the whole engine coolant temperature range. Also, even if the passing air flow amount by the ISC valve 12 varies due to the difference between the engine coolant temperatures Tw, in deceleration due to the full-closed condition of the throttle valve 8a, a proper intake pipe negative pressure for operation of the master back 15 can be always secured downstream of the throttle valve 8a to thereby keep the assist force of the master back 15 in a proper level, which makes it possible to eliminate the feeling of idle running and a difference between brake effects to thereby be able to enhance a driving feeling.

Also, since only the throttle full-closed change gear line of the basic change gear characteristic is shifted to the high revolution number side without shifting the whole basic change gear characteristic to the high revolution number side, even during an engine warm-up operation on the way to the completely warmed condition of the engine including an engine cool condition, if the actual throttle opening angle THRO exceeds the throttle full-closed change gear line given by the throttle opening angle guard value THRG by pressing down the accelerator pedal, then the change gear ratio is controlled to a change gear ratio which attaches importance to fuel consumption and running performance, which not only can enhance the braking performance in deceleration due to the full-closed condition of the throttle valve 8a during an engine warm-up operation on the way to the completely warmed condition of the engine including an engine cool condition, but also can enhance the fuel consumption and running performance. That is, according to the present embodiment, the driving feeling of the vehicle as well as the controllability on the continuously variable transmission can be improved.

Further, in deceleration due to the full-closed condition of the throttle valve 8a, proper intake pipe negative pressure can be secured downstream of the throttle valve 8a without decreasing the opening angle of the ISC valve 12 forcibly, which makes it possible to realize sudden deceleration without causing engine stall.

[Second Embodiment]

Next, a description will be given below of a second embodiment of a control system for controlling a continuously variable transmission according to the invention with reference to FIGS. 9 and 10. In the above-mentioned first embodiment, the throttle opening angle guard value THRG is set in accordance with the engine coolant temperature Tw. In contrast to this, in the present embodiment, there is employed the duty ratio ISC DUTY of a control duty signal with respect to the ISC valve 12, which determines directly the ISC opening angle corresponding to the ISC passing air flow amount, and thus the throttle opening angle guard value THRG is set in accordance with the duty ratio ISC DUTY.

That is, as described above, the basic control duty ratio with respect to the ISC valve 12 is set in accordance with the engine coolant temperature Tw. However, the duty ratio ISC DUTY of a control duty signal, which determines the opening angle of the ISC 12 corresponding to the ISC passing air flow amount, is not set only by the basic control duty ratio but is finally determined by correcting the basic control duty ratio using various correcting items which can compensate an increase in the engine load caused by the operations of various auxiliary machines to thereby stabilize the idle revolution number of the engine.

For example, when an auxiliary machine such as an air conditioner is in operation, the correcting item corrects or increases the basic control duty ratio in correspondence to an increase in the engine load caused by the operation of a compressor for the air conditioner so as to increase the opening angle of the ISC valve 12 and thus increase the ISC valve passing air flow amount, thereby compensating the increase in the engine load caused by the operation of the auxiliary machine and thus preventing the idle revolution number from decreasing.

Therefore, even in a condition where the warm-up of the engine is completed (in an engine completely warmed condition), when the auxiliary machine such as the air conditioner is in operation, the decrease in the idle revolution number can be compensated in correspondence to the increase in the engine load caused by the operation of the auxiliary machine such as the compressor for the air conditioner. Thanks to this, the opening angle of the ISC valve 12 is increased to thereby increase the ISC valve passing air flow amount, which makes it difficult for the proper intake pipe negative pressure to occur downstream of the throttle valve 8a.

Thus, the throttle opening angle guard value THRG, which specifies the throttle full-closed change gear line when referring to the basic change gear characteristic map, is set directly in accordance with the duty ratio ISC DUTY of a control duty signal corresponding to the opening angle of the ISC 12 which is the direct cause of a shortage of the intake pipe negative pressure downstream of the throttle valve 8a in the full-closed condition of the throttle valve 8a. Therefore, not only in deceleration due to the full-closed condition of the throttle valve 8a during the engine warm-up operation on the way to the engine completely warmed condition including the engine cool condition but also in deceleration due to the full-closed condition of the throttle valve 8a in a condition where the warm-up of the engine is completed (in an engine completely warmed condition), the opening angle of the ISC valve 12 can be made to increase with the operation of the auxiliary machine such as the air conditioner so that an increase in the engine load can be compensated. And, even if the flow amount of the air allowed to pass through by the ISC valve 12 increases, the target primary pulley revolution number NP given by the throttle full-closed change gear line can be shifted to the high revolution number side in correspondence to the increase in the ISC valve passing air flow amount. That is, since the engine revolution number Ne is increased by controlling the actual primary pulley revolution number NPo in such a manner to follow after the target primary pulley revolution number NP, the intake pipe negative pressure can be properly secured downstream of the throttle valve 8a, and the assist force of the master back 15 using the intake pipe negative pressure as the power source thereof can be thereby enhanced, so that a proper brake force can be secured.

In other words, in the present embodiment, the throttle opening angle guard value table 110 (see FIG. 4) in the first embodiment is employed as a table which uses, as a parameter, the duty ratio ISC DUTY of a control duty signal corresponding to the opening angle of the ISC valve 12 instead of the engine coolant temperature Tw.

And, the throttle opening angle guard value setting means 101 reads therein, instead of the engine coolant temperature Tw, the duty ratio ISC DUTY of a control duty signal corresponding to the opening angle of the ISC valve 12 through the SCIs 87 and 67 from the ECU 60, refers to the throttle opening angle guard value table with interpolation in accordance with the duty ratio ISC DUTY which determines the opening angle of the ISC valve 12, and sets throttle opening angle guard values THRG which are used to specify the throttle full-closed change gear line when referring to the basic change gear characteristic map 111.

Here, the throttle opening angle guard value table employed in the present embodiment can be produced in the following manner. That is, with the duty ratio ISC DUTY of a control duty signal with respect to the ISC valve 12 as a parameter, in deceleration due to the full-closed condition of the throttle valve 8a, in correspondence to an increase in the flow amount of the air allowed to pass by the ISC valve 12, the throttle opening angle, which the throttle full-closed change gear line is properly shifted to the high revolution number side when referring to the basic change gear characteristic map to thereby increase the engine revolution number, and secure the intake pipe negative pressure as the power source of the master back 15, is previously found by simulation or by experiment. The thus found throttle opening angles are set as throttle opening angle guard values THRG, and the throttle opening angle guard values THRG are arranged in the form of a table with the duty ratio ISC DUTY as a parameter and stored into the ROM 82. This table is the throttle opening angle guard value table that is employed in the present embodiment.

Figure 9:
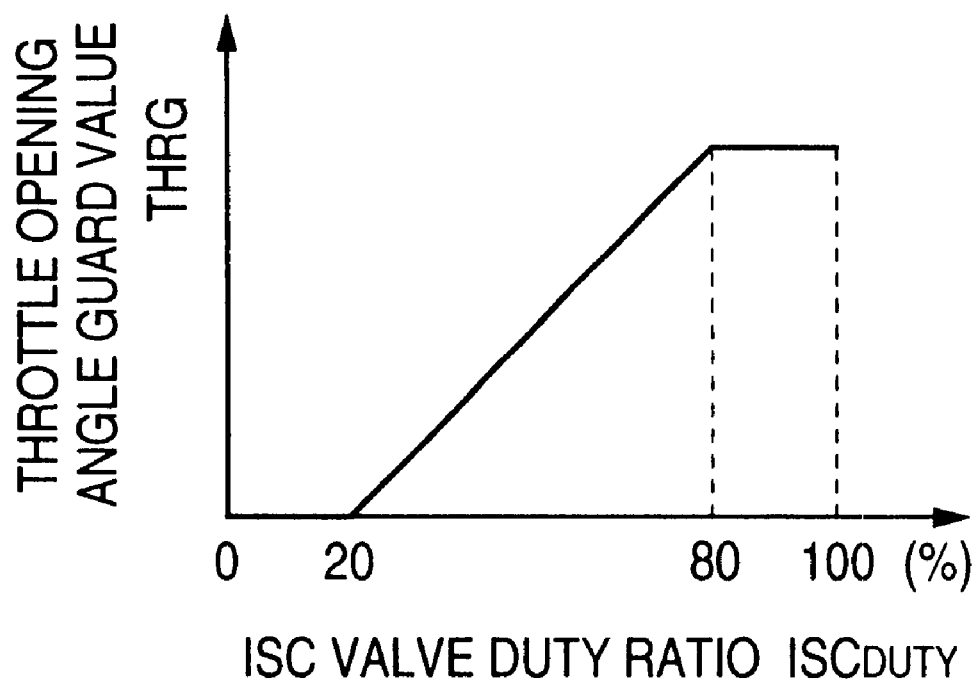
FIG. 9 is an explanatory view of a throttle opening angle guard value table employed in a second embodiment of a control system for controlling a continuously variable transmission.

Now, in FIG. 9, there is shown an example of the throttle opening angle guard value table. The ISC valve 12 employed in the present embodiment is structured such that the opening angle thereof increases with an increase in the duty ratio ISC DUTY of a control duty signal output from the ECU 60 and the flow amount of the air allowed to pass by the ISC valve 12 is thereby increased.

In more detail, the ISC valve 12 employed in the present embodiment is structured in the following manner. For example, a range of duty ratio ISC DUTY=15%–85% provides a controllable linear area in which the duty ratio ISC DUTY and the opening angle of the ISC valve 12 are proportional to each other. When the duty ratio ISC DUTY of a control duty signal with respect to the opening angle of the ISC valve 12 is equal to or more than 85%, the ISC valve 12 is opened full and the ISC valve passing air flow amount is the largest. Also, when the duty ratio ISC DUTY is equal to or less than 15%, the ISC valve 12 is closed full and the ISC valve passing air flow amount is 0. In addition, between the full-opened and full-closed conditions of the ISC valve 12, the duty ratio ISC DUTY of a control duty signal output from the ECU 60 and the opening angle of the ISC valve 12 are proportional to each other; and, as the duty ratio ISC DUTY decreases from ISC DUTY=85% corresponding to the full-closed condition of the ISC valve 12 to ISC DUTY=15% corresponding to the full-opened condition of the ISC valve 12, the opening angle of the ISC valve 12 decreases gradually and thus the ISC valve passing air flow amount decreases gradually.

Therefore, correspondingly to the above, the throttle opening angle guard values THRG is set as follows: that is, since, in an area equal to or larger than the first set value (in the present embodiment, for example, 80%) where the duty ratio ISC DUTY of a control duty signal with respect to the ISC valve 12 is set on the ISC valve full-opened side, the ISC valve 12 is substantially fully opened and thus the ISC valve passing air flow amount becomes substantially the largest, the throttle opening angle guard values THRG is set to a given value on the throttle opening side in order that the throttle full-closed change gear line according to the basic change gear characteristic can be shifted to the high revolution number side in correspondence to the above ISC valve passing air flow amount and, in deceleration due to the full-closed condition of the throttle valve 8a, the target primary pulley revolution number NP can be increased and thus the engine revolution number Ne can be increased.

And, as the duty ratio ISC DUTY lowers from the first set value (80%) toward a second set value (in the present embodiment, for example, 20%) which is set on the ISC valve full-closed side, the opening angle of the ISC valve 12 decreases gradually and thus the ISC valve passing air flow amount decreases gradually. Therefore, in order that an increase amount in the target primary pulley revolution number NP in deceleration due to the full-closed condition of the throttle valve 8a can be decreased to thereby control an increase in the engine revolution number Ne, the throttle opening angle guard values THRG is set such that it decreases gradually as the duty ratio ISC DUTY lowers.

And, in an area equal to or smaller than the second set value (20%) where the duty ratio ISC DUTY is set on the ISC valve full-closed side, the ISC valve 12 is substantially full closed and thus the ISC valve passing air flow amount becomes 0 or a very slight amount, so that the influence of the ISC valve passing air flow amount on the intake pipe negative pressure downstream of the throttle valve 8a can be neglected. For this reason, the throttle opening angle guard values THRG is set to the throttle full-closed opening angle which corresponds to no guard.

In the present embodiment, the throttle opening angle guard values THRG is given from the table with the duty ratio ISC DUTY of a control duty signal with respect to the ISC valve 12 as a parameter, and the throttle opening angle guard value THRG is set by retrieval of the table. However, this is not limitative. For example, a throttle opening angle guard value THRG may be given according to a functional formula of the duty ratio ISC DUTY of a control duty signal with respect to the ISC valve 12, and the upper and lower limits of the throttle opening angle guard value calculated from the functional formula may be restricted to thereby set the throttle opening angle guard values THRG.

By the way, other function means employed in the second embodiment are similar to those employed in the first embodiment and thus the description thereof is omitted here.

Figure 10:
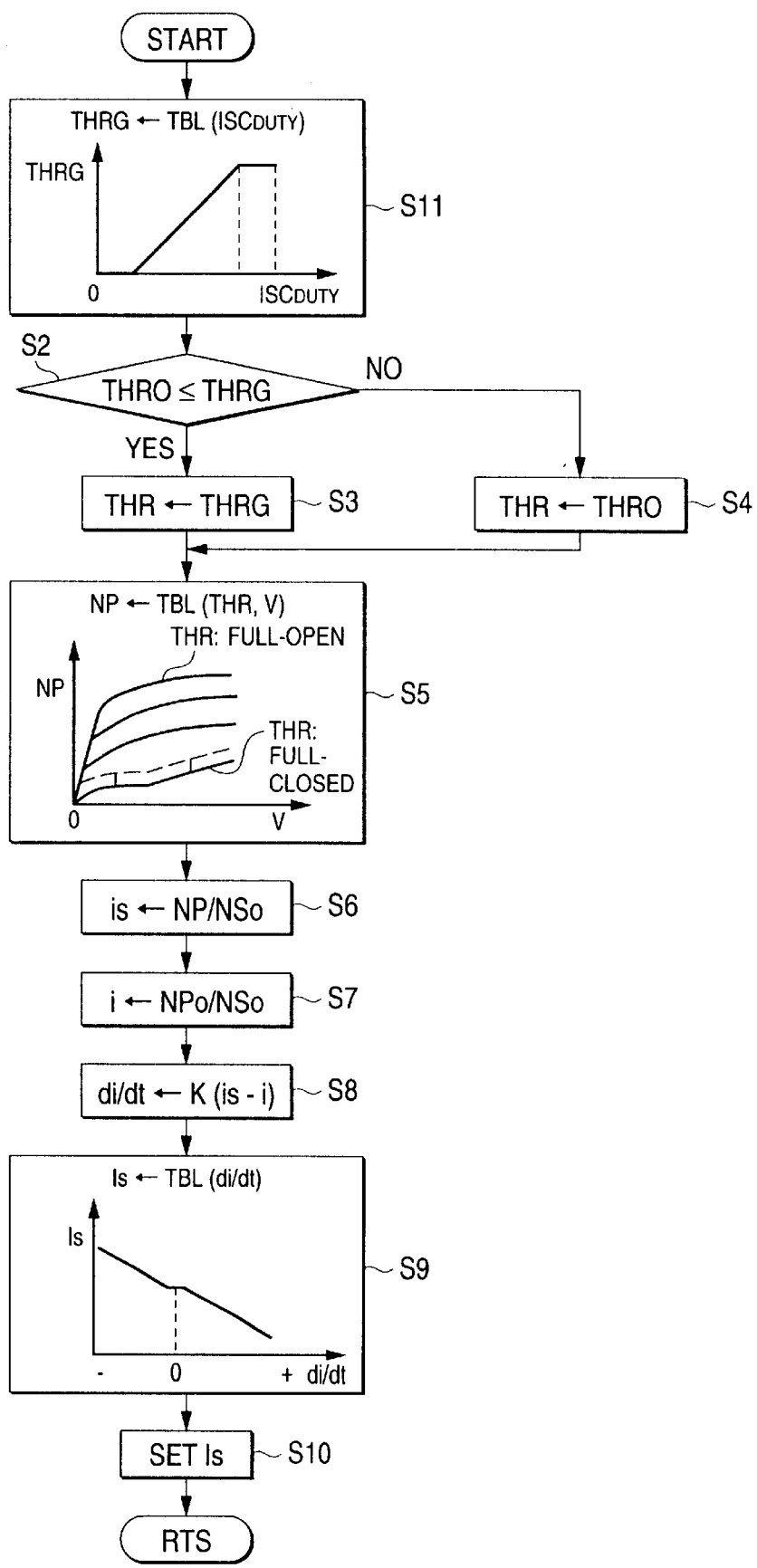
FIG. 10 is an explanatory view of a change gear control routine employed in the second embodiment; and, FIG. 11 is an explanatory view of a basic change gear characteristic map employed in a conventional control system for controlling a continuously variable transmission.

In the present embodiment, the change gear control processing by the TCU 80 is specifically realized according to a change gear control routine shown by a flow chart in FIG. 10.

By the way, the present change gear control routine is different from the routine employed in the first embodiment only in the first step S11. Therefore, similar steps to the first embodiment are given the same designations and thus the detailed description thereof is omitted here.

The change gear control routine shown in FIG. 10 is executed every given cycle (for example, every 20 msec). At first, in Step S11, the duty ratio ISC DUTY of a control duty signal with respect to the ISC valve 12 is read through the SCIs 87 and 67 from the ECU 60, the throttle opening angle guard value table (see FIG. 9) is referred to with interpolation in accordance with the duty ratio ISC DUTY which determines the opening angle of the ISC valve 12, and, when referring to the basic change gear characteristic map 111, the throttle opening angle guard value THRG for specifying the throttle full-closed change gear line is set. Then, the processing advances to Step S2.

In Steps S2–S4, the throttle opening angle guard value THRG is compared with the actual throttle opening angle THRO that is detected by the throttle opening angle sensor 46a, and larger one of them is set as a change gear ratio calculating throttle opening angle THR.

And, in Step S5, by referring to the basic change gear characteristic map 111 stored in the ROM 82 with the change gear ratio calculating throttle opening angle THR and vehicle speed V as parameters, there is set a target primary pulley revolution number NP which determines a target change gear ratio is. In Steps S6 and S7, from the target primary pulley revolution number NP, actual primary pulley revolution number NPo, and actual secondary pulley revolution number NSo, there are calculated the target change gear ratio is and actual change gear ratio i (is←NP/NSo, i←NP/NSo) respectively.

Next, in Step S8, a difference between the target change gear ratio is and actual change gear ratio i is multiplied by a coefficient K to thereby calculate a change gear speed di/dt. In Step S9, the solenoid current table 112 is referred to in accordance with the change gear speed di/dt. And, there is set a solenoid current value Is with respect to the solenoid 37a of the change gear control valve 37 which determines the control amount of the change gear control valve 37 for finding the proper primary pressure Pp to obtain the above change gear speed di/dt. In Step S10, the present solenoid current value Is is set, thereby ending the present change gear control routine.

And, a solenoid current according to the present solenoid current value Is is output to the solenoid 37a of the change gear control valve 37, due to a controlling operation on the primary pressure Pp by the change gear control valve 37 in accordance with the solenoid current value Is, oil of a given primary pressure Pp is supplied to the oil pressure cylinder 30b of the primary pulley 30, the actual change gear ratio i is controlled by the oil pressure cylinder 30b in such a manner to follow after the target change gear ratio is, and the actual primary pulley revolution number NPo is controlled in such a manner to converge to the target primary pulley revolution number NP.

In the present embodiment, in accordance with the duty ratio ISC DUTY of a control duty signal with respect to the ISC valve 12 which determines the opening angle of the ISC valve 12 corresponding to the ISC valve passing air flow amount, the throttle opening angle guard value THRG which specifies the throttle full-closed change gear line of the basic change gear characteristic is set. Therefore, in deceleration due to the full-closed condition of the throttle valve 8a, even if, as an auxiliary machine such as an air conditioner or the like is operated, the opening angle of the ISC valve 12 increases due to duty control to thereby increase the ISC valve passing air flow amount not only during an engine warm-up operation on the way to the completely warmed condition of the engine including an engine cool condition but also under the engine completely warmed condition, the throttle full-closed change gear line of the basic change gear characteristic can be shifted to the high revolution number side by the throttle opening angle guard value THRG, in correspondence to the above increase in the ISC valve passing air flow amount. And, in deceleration due to the full-closed condition of the throttle valve 8a, the actual primary pulley revolution number NPo is controlled to follow after the target primary pulley revolution number NP in correspondence to an increase in the target primary pulley revolution number NP, so that the engine revolution number Ne of the engine 1 connected to the primary pulley 30 can be increased accurately in correspondence to an increase in the ISC valve passing air flow amount. This makes it possible to secure proper intake pipe negative pressure downstream of the throttle valve 8a.

Therefore, not only during an engine warm-up operation on the way to the completely warmed condition of the engine including an engine cool condition but also under the engine completely warmed condition, even if, as an auxiliary machine such as an air conditioner or the like is operated, the opening angle of the ISC valve 12 increases due to duty control to thereby increase the ISC valve passing air flow amount, in deceleration due to the full-closed condition of the throttle valve 8a, the intake pipe negative pressure can be properly secured downstream of the throttle valve 8a to thereby enhance the assist force of the master back 15 which uses the intake pipe negative pressure as the power source thereof, with the result that a proper brake force can be provided.

Also, since the throttle opening angle guard value THRG is set in accordance with the duty ratio ISC DUTY of a control duty signal with respect to the ISC valve 12 to thereby specify the throttle full-closed change gear line of the basic change gear characteristic, in deceleration due to the full-closed condition of the throttle valve 8a, in correspondence to a difference between the ISC passing air flow amounts, the target primary pulley revolution number NP given by the throttle full-closed change gear line of the basic change gear characteristic map can be optimally shifted to the high revolution number side by the throttle opening angle guard value THRG. Therefore, due to the following control of the actual primary pulley revolution number NPo after the target primary pulley revolution number NP, in deceleration due to the full-closed condition of the throttle valve 8a, over the whole range thereof, in accurate correspondence to a difference between the flow amounts of the air allowed to pass by the ISC valve 12, there can be obtained an engine revolution number Ne which is proper to secure the intake pipe negative pressure downstream of the throttle valve 8a.

Therefore, in deceleration due to the full-closed condition of the throttle valve 8a, over the whole range thereof, the brake assist force given by the master back 15 can be matched to a difference between the ISC valve passing air flow amounts caused not only by the engine coolant temperature Tw but also by other factors including the operation of an auxiliary machine such as an air conditioner or the like.

Also, even if the passing air flow amount of the ISC valve 12 varies, in deceleration due to the full-closed condition of the throttle valve 8a, over the whole range thereof, intake pipe negative pressure proper to operate the master back 15 can be always secured downstream of the throttle valve 8a to thereby maintain the assist force of the master back 15 in a proper level, which makes it possible not only to eliminate the idle running feeling and different braking effects but also to enhance the driving feeling further.

By the way, the present invention is not limited to the above-mentioned embodiments but, of course, various changes and modifications are also possible without departing from the scope of the patent claims appended hereto.

For example, in the illustrated embodiments, there is employed the continuously variable transmission of a belt type. However, according to the invention, there can also be employed other types of continuously variable transmissions such as a continuously variable transmission of a troidal type and the like. Also, description has been given hereinbefore of the structure in which the electromagnetic clutch 27 is interposed between the engine 1 and continuously variable transmission 29. However, the invention can also apply to a structure in which, instead of the electromagnetic clutch 27, a torque converter is interposed between the engine 1 and continuously variable transmission 29.

Also, in the illustrated embodiments, description has been given hereinbefore of the structure which employs the ISC valve 12 of a duty solenoid type. However, according to the invention, there can also be employed a structure which uses an ISC valve of a proportional solenoid type (a linear solenoid type), or an ISC valve of a stepping motor type.

Further, in the above-mentioned second embodiment, in correspondence to the ISC valve 12 of a duty solenoid type, the duty ratio ISC DUTY of a control duty signal with respect to the ISC valve 12 is used as the ISC valve opening angle. However, when an ISC valve of a proportional solenoid type is used instead of the ISC valve 12 of a duty solenoid type, a control current value, which is set by the ECU 60 for the ISC valve, can be used as the ISC valve opening angle. Also, when an ISC valve of a stepping motor type is used, a control amount (step number), which is set by the ECU 60 for the ISC valve, can be used as the ISC valve opening angle.

As has been described heretofore, according to the invention, in view of the following two facts that the opening angle of an idle speed control valve, which determines the throttle valve passing air flow amount causing the shortage of the intake pipe pressure downstream of the throttle valve in the full-closed condition of the throttle valve, depends on the engine coolant temperature and also that the engine revolution number depends on the primary pulley revolution number, the throttle opening angle guard value, which specifies the throttle full-closed change gear line in the basic change gear characteristic of the continuously variable transmission, is set in accordance with the engine coolant temperature. And, the actual throttle opening angle is compared with the throttle opening angle guard value, one of them, which is found larger, is set as the change gear ratio calculating throttle opening angle. Further, the basic change gear characteristic map is referred to with the thus set change gear ratio calculating throttle opening angle and vehicle speed as parameters, thereby setting the target primary pulley revolution number which determines the target change gear ratio. Thanks to this, even during the engine warm-up operation on the way to the engine completely warmed condition including the engine cool condition where the air flow amount allowed to pass by the idle speed control (ISC) valve increases, in deceleration due to the full-closed condition of the throttle valve, the throttle full-closed change gear line can be shifted to the high revolution number side properly in accordance with an increase in the passing air flow amount allowed by the idle speed control valve, and the revolution number of the engine connected to the primary pulley can be increased properly in accordance with an increase in the passing air flow amount allowed by the idle speed control valve due to the following control of the actual primary pulley revolution number after the target primary pulley revolution number, thereby being surely able to secure the proper intake pipe negative pressure downstream of the throttle valve. Therefore, even during the engine warm-up operation on the way to the engine completely warmed condition including the engine cool condition where the air flow amount allowed to pass by the idle speed control (ISC) valve increases, in deceleration due to the full-closed condition of the throttle valve, the proper intake pipe negative pressure can be positively secured downstream of the throttle valve to thereby enhance the assist force of the master back using the intake pipe negative pressure as the power source thereof, so that a proper brake force can be provided.

Also, the throttle opening angle guard value, which specifies the throttle full-closed change gear line in the basic change gear characteristic of the continuously variable transmission, is set in accordance with the engine coolant temperature which determines the opening angle of the idle speed control valve corresponding to the passing air flow amount allowed by the idle speed control valve and, in deceleration due to the full-closed condition of the throttle valve, the actual primary pulley revolution number is controlled in such a manner that it follows after the target primary pulley revolution number set in accordance with the throttle opening angle guard value. Therefore, over the whole engine coolant temperature range, in correspondence to a difference between the passing air flow amounts allowed by the idle speed control valve, there can be obtained the engine revolution number which is proper to obtain the intake pipe negative pressure downstream of the throttle valve. Accordingly, the intake pipe negative pressure, that is, the assist force of the master back can be matched properly, over the whole engine coolant temperature range, to differences between the passing air flow amounts caused by differences between the opening angles of the idle speed control valve continuously varying according to the engine coolant temperatures.

Also, even if the passing air flow amount by the idle speed control valve varies according to differences between the engine coolant temperatures, in deceleration due to the full-closed condition of the throttle valve, the intake pipe negative pressure proper to operate the master back can be always secured downstream of the throttle valve to thereby hold the assist force of the master back in a proper level. This makes it possible not only to eliminate the idle running feeling and different braking effects but also to enhance the driving feeling.

Further, only the throttle full-closed change gear line in the basic change gear characteristic of the continuously variable transmission can be shifted to the high revolution number side without shifting the whole of the basic change gear characteristic to the high revolution number side. Therefore, even during the engine warm-up operation on the way to the engine completely warmed condition including the engine cool condition, if, by pressing down the accelerator pedal, the actual throttle opening angle exceeds the throttle full-closed change gear line given by the throttle opening angle guard value, then the then change gear ratio is controlled to a change gear ratio which attaches importance to fuel consumption and running performance. This makes it surely possible not only to enhance the brake performance in deceleration due to the full-closed condition of the throttle valve during the engine warm-up operation on the way to the engine completely warmed condition including the engine cool condition, but also to enhance the fuel consumption and running performance, which can improve the driving feeling as well as controllability on the continuously variable transmission.

Still further, in deceleration due to the full-closed condition of the throttle valve, without decreasing the opening angle of the idle speed control valve forcibly, the intake pipe negative pressure can be secured downstream of the throttle valve, which makes it possible to realize sudden deceleration without causing the engine to fail.

Further, according to the invention, in setting the throttle opening angle guard value, when the engine coolant temperature is lower than a first set value indicating an engine cool condition, then the throttle opening angle guard value is set at a given value on the throttle valve opening side and, as the engine coolant temperature rises from the first set value up to a second set value which can be regarded as the indication of an engine completely warmed condition, the throttle opening angle guard value is set in such a manner that it decreases gradually. In addition, when the engine coolant temperature is equal to or higher than the second set value, the throttle opening angle guard value is set at the throttle full-closed opening angle. Thanks to this, in addition to the above effect, there can be provided another effect: that is, even during the engine warm-up operation on the way to the engine completely warmed condition including the engine cool condition, in deceleration due to the full-closed condition of the throttle valve, in correspondence to a difference between the idle speed control valve passing air flow amounts caused by a difference between the engine coolant temperatures, the target primary pulley revolution number given by the throttle full-closed change gear line in the basic change gear characteristic of the continuously variable transmission can be optimally shifted to the high revolution number side by the throttle opening angle guard value.

Moreover, the throttle opening angle guard value is set in accordance with the opening angle of an idle speed control valve directly corresponding to the passing air flow amount by the idle speed control valve causing the shortage of the intake pipe pressure downstream of the throttle valve in the full-closed condition of the throttle valve, and the throttle full-closed change gear line in the basic change gear characteristic of the continuously variable transmission is specified by the throttle opening angle guard value. Therefore, in deceleration due to the full-closed condition of the throttle valve, even if the idle speed control valve passing air flow amount is caused to increase not only by a difference between the idle speed control valve passing air flow amounts caused by a difference between the engine coolant temperatures but also by an increase in the opening angle of the idle speed control valve resulting from the operation of an auxiliary machine such as an air conditioner or the like in the engine completely warmed condition, the engine revolution number can be increased in correspondence to such increase in the idle speed control valve passing air flow amount. Accordingly, proper intake pipe negative pressure downstream of the throttle valve is secured, not only to thereby enhance the assist force of the master back using the intake pipe negative pressure as the power source thereof but also to provide a further proper brake force.

Also, since the throttle opening angle guard value is set in accordance with the opening angle of the idle speed control valve and the throttle full-closed change gear line in the basic change gear characteristic is specified by the thus set throttle opening angle guard value, in deceleration due to the full-closed condition of the throttle valve, in correspondence to the difference between the idle speed control valve passing air flow amounts, the target primary pulley revolution number given by the throttle full-closed change gear line of the basic change gear characteristic map can be properly shifted to the high revolution number side by the throttle opening angle guard value. And, due to the following control of the actual primary pulley revolution number after the target primary pulley revolution number, in deceleration due to the full-closed condition of the throttle valve, over the whole range thereof, accurately in correspondence to the difference between the idle speed control valve passing air flow amounts, there can be obtained an engine revolution number which is proper to obtain the intake pipe pressure downstream of the throttle valve. Therefore, in deceleration due to the full-closed condition of the throttle valve, over the whole range thereof, the brake assist force by the master back can be accurately matched to the differences between the idle speed control valve passing air flow amounts which are caused not only by the different engine coolant temperatures but also by other factors such as the operation of an auxiliary machine such as an air conditioner or the like.

Further, even if the idle speed control valve passing air flow amount varies, in deceleration due to the full-closed condition of the throttle valve, there can be always secured downstream of the throttle valve intake pipe negative pressure which is proper to operate the master back, thereby being able to hold the assist force of the master back in a proper level. Therefore, over the whole range of the deceleration, there can be eliminated the idle running feeling and different brake effects, which in turn can improve the driving feeling further.

Moreover, when the opening angle of the idle speed control valve is equal to or larger than a first set value set on the throttle valve full-open side, the throttle opening angle guard value is set at a given value on the throttle valve opening side and, as the opening angle of the idle speed control valve decreases from the first set value toward a second set value set on the throttle valve full-closed side, the throttle opening angle guard value is set in such a manner that it decreases gradually. And, when opening angle of the idle speed control valve is equal to or smaller than the second set value set on the throttle valve full-closed side, then the throttle opening angle guard value is set at the throttle valve full-closed opening angle. Therefore, in addition to the effects of the invention as set forth in claim 3, in deceleration due to the full-closed condition of the throttle valve, even if the idle speed control valve passing air flow amount is caused to increase not only by a difference between the idle speed control valve passing air flow amounts caused by a difference between the engine coolant temperatures but also by an increase in the opening angle of the idle speed control valve resulting from the operation of an auxiliary machine such as an air conditioner or the like in the engine completely warmed condition, in correspondence to such increase in the idle speed control valve passing air flow amount, the target primary pulley revolution number given by the throttle full-closed change gear line of the basic change gear characteristic map can be optimally shifted to the high revolution number side by the throttle opening angle guard value. Thanks to this, in deceleration, the engine revolution number obtained through the idle revolution number control by the idle speed control valve can be matched to the engine revolution number obtained through the change gear control by the continuously variable transmission, thereby being able to improve the control performance of the control unit.

The present disclosure relates to the subject matter contained in Japanese patent application No. Hei.10-284224 filed on Oct. 6, 1998 which is expressly incorporated herein by reference in its entirety.

What is claimed is:

1. A control system for controlling a continuously variable transmission of a vehicle having an idle speed control valve disposed in a bypass passage bypassing a throttle valve, wherein said continuously variable transmission includes:
   a primary pulley inputting therein the rotation of an engine, which generates intake pipe negative pressure on the downstream of the throttle valve and applies the intake pipe negative pressure to a master vac, the master vac being a part of a brake assist system and serving as the power source thereof; and
   a secondary pulley inputting therein power from the primary pulley through power transmission means;
   said control system comprising:
      throttle opening angle guard value setting means for setting a throttle opening angle guard value, which specifies a throttle full-closed change gear line, in accordance with an engine coolant temperature;
      throttle opening angle comparing means for comparing an actual throttle opening angle with said throttle opening angle guard value;
      change gear ratio calculating throttle opening angle setting means, in response to a result of said comparing means, for setting a larger one of said actual throttle opening angle and said throttle opening angle guard value as a change gear ratio calculating throttle opening angle; and,
      target primary pulley revolution number setting means for setting a target primary pulley revolution number while referring to a basic change gear characteristic map which gives said target primary pulley revolution number with said change gear ratio calculating throttle opening angle and vehicle speed as parameters, wherein said control system controls an actual change gear ratio given by the primary and secondary pulleys to converge to a target change gear ratio calculated from a ratio between said target primary pulley revolution number and an actual secondary pulley revolution number.

2. A control system for controlling a continuously variable transmission as set forth in claim 1, wherein said throttle opening angle guard value setting means sets said throttle opening angle guard value at a given value on the throttle valve opening side when said engine coolant temperature is lower than a first set value indicating an engine cool condition; sets said throttle opening angle guard value to decrease gradually, as said engine coolant temperature rises from said first set value toward a second set value which can be regarded as an indication of an engine warm-up completed condition; and, sets said throttle opening angle guard value at a throttle valve full-closed opening angle when said engine coolant temperature is equal to or higher than said second set value.

3. A control system for controlling a continuously variable transmission of a vehicle having an idle speed control valve disposed in a bypass passage bypassing a throttle valve, wherein said continuously variable transmission includes:

a primary pulley inputting therein the rotation of an engine, which generates intake pipe negative pressure on the downstream of the throttle valve and applies the intake pipe negative pressure to a master vac, the master vac being part of a brake assist system and serving as the power source thereof; and a secondary pulley inputting therein power from the primary pulley through power transmission means;

said control system comprising:

throttle opening angle guard value setting means for setting a throttle opening angle guard value, which specifies a throttle full-closed change gear line, in accordance with an opening angle of said idle speed control valve;

throttle opening angle comparing means for comparing an actual throttle opening angle with said throttle opening angle guard value;

change gear ratio calculating throttle opening angle setting means, in accordance with a result of a comparison of said comparing means, for setting a larger one of said actual throttle opening angle and said throttle opening angle guard value as a change gear ratio calculating throttle opening angle; and, target primary pulley revolution number setting means for setting a target primary pulley revolution number while referring to a basic change gear characteristic map which gives said target primary pulley revolution number with said change gear ratio calculating throttle opening angle and vehicle speed as parameters, wherein said control system controls an actual change gear ratio given by the primary and secondary pulleys to converge to a target change gear ratio calculated from a ratio between said target primary pulley revolution number and an actual secondary pulley revolution number.

4. A control system for controlling a continuously variable transmission as set forth in claim 3, wherein said throttle opening angle guard value setting means sets said throttle opening angle guard value at a given value on an opening side of the throttle valve when said opening angle of said idle speed control valve is equal to or larger than a first set value set on a full-open side of the idle speed control valve; sets said throttle opening angle guard value to decrease gradually, as said opening angle of said idle speed control valve decreases from a first set value toward a second set value set on a full-closed side of the idle speed control valve; and, sets said throttle opening angle guard value at a throttle valve full-closed opening angle when said opening angle of said idle speed control valve is equal to or smaller than said second set value.

* * * * *